(12) United States Patent
Spaur et al.

(10) Patent No.: US 8,116,026 B2
(45) Date of Patent: *Feb. 14, 2012

(54) METHOD AND SYSTEM FOR HEAD POSITION CONTROL IN EMBEDDED DISK DRIVE CONTROLLERS

(75) Inventors: Michael R. Spaur, Dana Point, CA (US); Raymond A. Sandoval, Aliso Viejo, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/338,071

(22) Filed: Dec. 18, 2008

(65) Prior Publication Data

US 2009/0097157 A1 Apr. 16, 2009

Related U.S. Application Data

(63) Continuation of application No. 11/592,813, filed on Nov. 3, 2006, now Pat. No. 7,471,485, which is a continuation of application No. 10/793,207, filed on Mar. 4, 2004, now Pat. No. 7,139,150.

(60) Provisional application No. 60/543,233, filed on Feb. 10, 2004.

(51) Int. Cl.
*G11B 5/596* (2006.01)

(52) U.S. Cl. .................................. 360/77.08

(58) Field of Classification Search ............... 360/77.08
See application file for complete search history.

(56) References Cited

U.S. PATENT DOCUMENTS

| | | |
|---|---|---|
| 3,800,281 A | 3/1974 | Devore et al. |
| 3,988,716 A | 10/1976 | Fletcher et al. |
| 4,001,883 A | 1/1977 | Strout et al. |
| 4,016,368 A | 4/1977 | Apple, Jr. |
| 4,050,097 A | 9/1977 | Miu et al. |
| 4,080,649 A | 3/1978 | Calle et al. |
| 4,156,867 A | 5/1979 | Bench et al. |
| 4,225,960 A | 9/1980 | Masters |
| 4,275,457 A | 6/1981 | Leighou et al. |
| 4,390,969 A | 6/1983 | Hayes |
| 4,412,161 A | 10/1983 | Cornaby |
| 4,451,898 A | 5/1984 | Palermo et al. |
| 4,486,750 A | 12/1984 | Aoki |
| 4,500,926 A | 2/1985 | Yoshimaru et al. |
| 4,587,609 A | 5/1986 | Boudreau et al. |
| 4,603,382 A | 7/1986 | Cole et al. |
| 4,625,321 A | 11/1986 | Pechar et al. |

(Continued)

FOREIGN PATENT DOCUMENTS

EP 0528273 2/1993

(Continued)

OTHER PUBLICATIONS

PCT International Search Report, Doc. No. PCT/US00/15084, Dated Nov. 15, 2000, 2 pages.

(Continued)

*Primary Examiner* — Hoa T Nguyen
*Assistant Examiner* — James L Habermehl

(57) ABSTRACT

A track follow controller includes a burst selector selecting at least one burst pair based on burst pair selection data. A linear position calculator calculates a primary head position and a secondary head position based on the at least one burst pair, and calculates a head linear position based on the primary head position and the secondary head position.

18 Claims, 20 Drawing Sheets

U.S. PATENT DOCUMENTS

| | | | |
|---|---|---|---|
| 4,667,286 A | 5/1987 | Young et al. | |
| 4,777,635 A | 10/1988 | Glover | |
| 4,788,608 A | 11/1988 | Tsujisawa | |
| 4,805,046 A | 2/1989 | Kuroki et al. | |
| 4,807,116 A | 2/1989 | Katzman et al. | |
| 4,807,253 A | 2/1989 | Hagenauer et al. | |
| 4,809,091 A | 2/1989 | Miyazawa et al. | |
| 4,811,282 A | 3/1989 | Masina | |
| 4,812,769 A | 3/1989 | Agoston | |
| 4,860,333 A | 8/1989 | Hitzinger et al. | |
| 4,866,606 A | 9/1989 | Kopetz | |
| 4,881,232 A | 11/1989 | Sako et al. | |
| 4,920,535 A | 4/1990 | Watanabe et al. | |
| 4,949,342 A | 8/1990 | Shimbo et al. | |
| 4,970,418 A | 11/1990 | Masterson | |
| 4,972,417 A | 11/1990 | Sako et al. | |
| 4,975,915 A | 12/1990 | Sako et al. | |
| 4,989,190 A | 1/1991 | Kuroe et al. | |
| 5,014,186 A | 5/1991 | Chisholm | |
| 5,023,612 A | 6/1991 | Liu | |
| 5,027,357 A | 6/1991 | Yu et al. | |
| 5,050,013 A | 9/1991 | Holsinger | |
| 5,051,998 A | 9/1991 | Murai et al. | |
| 5,068,755 A | 11/1991 | Hamilton et al. | |
| 5,068,857 A | 11/1991 | Yoshida | |
| 5,072,420 A | 12/1991 | Conley et al. | |
| 5,088,093 A | 2/1992 | Storch et al. | |
| 5,109,500 A | 4/1992 | Iseki et al. | |
| 5,117,442 A | 5/1992 | Hall | |
| 5,127,098 A | 6/1992 | Rosenthal et al. | |
| 5,133,062 A | 7/1992 | Joshi et al. | |
| 5,136,592 A | 8/1992 | Weng | |
| 5,146,585 A | 9/1992 | Smith, III | |
| 5,157,669 A | 10/1992 | Yu et al. | |
| 5,162,954 A | 11/1992 | Miller et al. | |
| 5,193,197 A | 3/1993 | Thacker | |
| 5,204,859 A | 4/1993 | Paesler et al. | |
| 5,218,564 A | 6/1993 | Haines et al. | |
| 5,220,569 A | 6/1993 | Hartness | |
| 5,237,593 A | 8/1993 | Fisher et al. | |
| 5,243,471 A | 9/1993 | Shinn | |
| 5,249,271 A | 9/1993 | Hopkinson | |
| 5,257,143 A | 10/1993 | Zangenehpour | |
| 5,261,081 A | 11/1993 | White et al. | |
| 5,268,800 A | 12/1993 | Nielsen | |
| 5,271,018 A | 12/1993 | Chan | |
| 5,274,509 A | 12/1993 | Buch | |
| 5,276,564 A | 1/1994 | Hessing et al. | |
| 5,276,662 A | 1/1994 | Shaver, Jr. et al. | |
| 5,276,807 A | 1/1994 | Kodama et al. | |
| 5,280,488 A | 1/1994 | Glover et al. | |
| 5,285,327 A | 2/1994 | Hetzler | |
| 5,285,451 A | 2/1994 | Henson et al. | |
| 5,301,333 A | 4/1994 | Lee | |
| 5,307,216 A | 4/1994 | Cook et al. | |
| 5,315,708 A | 5/1994 | Eidler et al. | |
| 5,339,443 A | 8/1994 | Lockwood | |
| 5,361,266 A | 11/1994 | Kodama et al. | |
| 5,361,267 A | 11/1994 | Godiwala et al. | |
| 5,408,644 A | 4/1995 | Schneider et al. | |
| 5,420,984 A | 5/1995 | Good et al. | |
| 5,428,627 A | 6/1995 | Gupta | |
| 5,440,751 A | 8/1995 | Santeler et al. | |
| 5,465,343 A | 11/1995 | Henson et al. | |
| 5,487,170 A | 1/1996 | Bass et al. | |
| 5,488,688 A | 1/1996 | Gonzales et al. | |
| 5,491,701 A | 2/1996 | Zook | |
| 5,500,848 A | 3/1996 | Best et al. | |
| 5,506,989 A | 4/1996 | Boldt et al. | |
| 5,507,005 A | 4/1996 | Kojima et al. | |
| 5,519,837 A | 5/1996 | Tran | |
| 5,523,903 A | 6/1996 | Hetzler et al. | |
| 5,544,180 A | 8/1996 | Gupta | |
| 5,544,346 A | 8/1996 | Amini | |
| 5,546,545 A | 8/1996 | Rich | |
| 5,546,548 A | 8/1996 | Chen et al. | |
| 5,563,896 A | 10/1996 | Nakaguchi | |
| 5,572,148 A | 11/1996 | Lytle et al. | |
| 5,574,867 A | 11/1996 | Khaira | |
| 5,581,715 A | 12/1996 | Verineky et al. | |
| 5,583,999 A | 12/1996 | Sato et al. | |
| 5,592,404 A | 1/1997 | Zook | |
| 5,600,506 A * | 2/1997 | Baum et al. | 360/77.08 |
| 5,600,662 A | 2/1997 | Zook | |
| 5,602,693 A * | 2/1997 | Brunnett et al. | 360/77.08 |
| 5,602,857 A | 2/1997 | Zook et al. | |
| 5,615,190 A | 3/1997 | Best et al. | |
| 5,623,672 A | 4/1997 | Popat | |
| 5,627,695 A | 5/1997 | Prins et al. | |
| 5,640,602 A | 6/1997 | Takase | |
| 5,649,230 A | 7/1997 | Lentz | |
| 5,659,437 A * | 8/1997 | Tsunekawa et al. | 360/77.08 |
| 5,664,121 A | 9/1997 | Cerauskis | |
| 5,689,656 A | 11/1997 | Baden et al. | |
| 5,691,994 A | 11/1997 | Acosta et al. | |
| 5,692,135 A | 11/1997 | Alvarez, II et al. | |
| 5,692,165 A | 11/1997 | Jeddeloh et al. | |
| 5,719,516 A | 2/1998 | Sharpe-Geisler | |
| 5,729,718 A | 3/1998 | Au | |
| 5,740,466 A | 4/1998 | Geldman et al. | |
| 5,745,793 A | 4/1998 | Atsatt et al. | |
| 5,754,759 A | 5/1998 | Clarke et al. | |
| 5,758,188 A | 5/1998 | Appelbaum et al. | |
| 5,760,990 A * | 6/1998 | Ukani et al. | 360/77.08 |
| 5,771,131 A * | 6/1998 | Pirzadeh | 360/77.08 |
| 5,784,569 A | 7/1998 | Miller et al. | |
| 5,794,073 A | 8/1998 | Ramakrishnan et al. | |
| 5,796,543 A | 8/1998 | Ton-That | |
| 5,801,998 A | 9/1998 | Choi | |
| 5,818,886 A | 10/1998 | Castle | |
| 5,822,142 A | 10/1998 | Hicken | |
| 5,831,922 A | 11/1998 | Choi | |
| 5,835,930 A | 11/1998 | Dobbek | |
| 5,841,722 A | 11/1998 | Willenz | |
| 5,844,844 A | 12/1998 | Bauer et al. | |
| 5,850,422 A | 12/1998 | Chen | |
| 5,854,918 A | 12/1998 | Baxter | |
| 5,867,341 A * | 2/1999 | Volz et al. | 360/77.08 |
| 5,890,207 A | 3/1999 | Sne et al. | |
| 5,890,210 A | 3/1999 | Ishii et al. | |
| 5,892,634 A | 4/1999 | Ito et al. | |
| 5,907,717 A | 5/1999 | Ellis | |
| 5,912,906 A | 6/1999 | Wu et al. | |
| 5,925,135 A | 7/1999 | Trieu et al. | |
| 5,937,435 A | 8/1999 | Dobbek et al. | |
| 5,950,223 A | 9/1999 | Chiang et al. | |
| 5,968,180 A | 10/1999 | Baco | |
| 5,983,293 A | 11/1999 | Murakami | |
| 5,991,911 A | 11/1999 | Zook | |
| 6,029,226 A | 2/2000 | Ellis et al. | |
| 6,029,250 A | 2/2000 | Keeth | |
| 6,041,417 A | 3/2000 | Hammond et al. | |
| 6,052,250 A | 4/2000 | Golowka et al. | |
| 6,064,542 A * | 5/2000 | Shepherd | 360/77.08 |
| 6,065,053 A | 5/2000 | Nouri et al. | |
| 6,067,206 A | 5/2000 | Hull et al. | |
| 6,070,200 A | 5/2000 | Gates et al. | |
| 6,078,447 A | 6/2000 | Sim | |
| 6,081,849 A | 6/2000 | Born et al. | |
| 6,091,567 A | 7/2000 | Cooper et al. | |
| 6,092,231 A | 7/2000 | Sze | |
| 6,094,320 A | 7/2000 | Ahn | |
| 6,101,064 A * | 8/2000 | Shepherd | 360/77.08 |
| 6,122,133 A * | 9/2000 | Nazarian et al. | 360/77.08 |
| 6,124,994 A | 9/2000 | Malone, Sr. | |
| 6,134,063 A | 10/2000 | Weston-Lewis et al. | |
| 6,157,984 A | 12/2000 | Fisher | |
| 6,175,465 B1 * | 1/2001 | Kawachi et al. | 360/77.08 |
| 6,178,486 B1 | 1/2001 | Gill et al. | |
| 6,188,539 B1 * | 2/2001 | Elliot et al. | 360/77.08 |
| 6,192,499 B1 | 2/2001 | Yang | |
| 6,201,655 B1 | 3/2001 | Watanabe et al. | |
| 6,223,303 B1 | 4/2001 | Billings et al. | |
| 6,279,089 B1 | 8/2001 | Schibilla et al. | |
| 6,297,926 B1 | 10/2001 | Ahn | |
| 6,330,626 B1 | 12/2001 | Dennin et al. | |
| 6,347,018 B1 | 2/2002 | Kadlec et al. | |

| | | | |
|---|---|---|---|
| 6,381,659 B2 | 4/2002 | Proch et al. | |
| 6,401,149 B1 | 6/2002 | Dennin et al. | |
| 6,470,461 B1 | 10/2002 | Pinvidic et al. | |
| 6,487,631 B2 | 11/2002 | Dickinson et al. | |
| 6,490,635 B1 | 12/2002 | Holmes | |
| 6,526,476 B2 | 2/2003 | Wilson et al. | |
| 6,530,000 B1 | 3/2003 | Krantz et al. | |
| 6,574,676 B1 | 6/2003 | Megiddo | |
| 6,646,822 B1 | 11/2003 | Tuttle et al. | |
| 6,662,334 B1 | 12/2003 | Stenfort | |
| 6,710,966 B1 | 3/2004 | Codilian et al. | |
| 6,768,609 B2 * | 7/2004 | Heydt et al. | 360/77.08 |
| 6,785,080 B1 | 8/2004 | Sun et al. | |
| 6,826,650 B1 | 11/2004 | Krantz et al. | |
| 6,915,416 B2 | 7/2005 | Deng et al. | |
| 6,917,487 B2 | 7/2005 | Fukushima | |

FOREIGN PATENT DOCUMENTS

| | | |
|---|---|---|
| EP | 0622726 | 11/1994 |
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1998 |

OTHER PUBLICATIONS

Blahut R. Digital Transmission of Information (Dec. 4, 1990), pp. 429-430.
Hwang, Kai and Briggs, Faye A., "Computer Architecture and Parallel Processing" pp. 156-164.
Zeidman, Sob, "Interleaving DRAMS for faster access", System Design ASIC & EDA, pp. 24-34 (Nov. 1993).
P.M. Bland et. al. Shared Storage Bus Circuitry, IBM Technical Disclosure Bulletin, vol. 25, No. 4, Sep. 1982, pp. 2223-2224.
PCT search report for PCT/US00/07780 mailed Aug. 2, 2000, 4 Pages.
PCT Search Report for PCT/US01/22404, mailed Jan. 29, 2003 4 Pages.

* cited by examiner

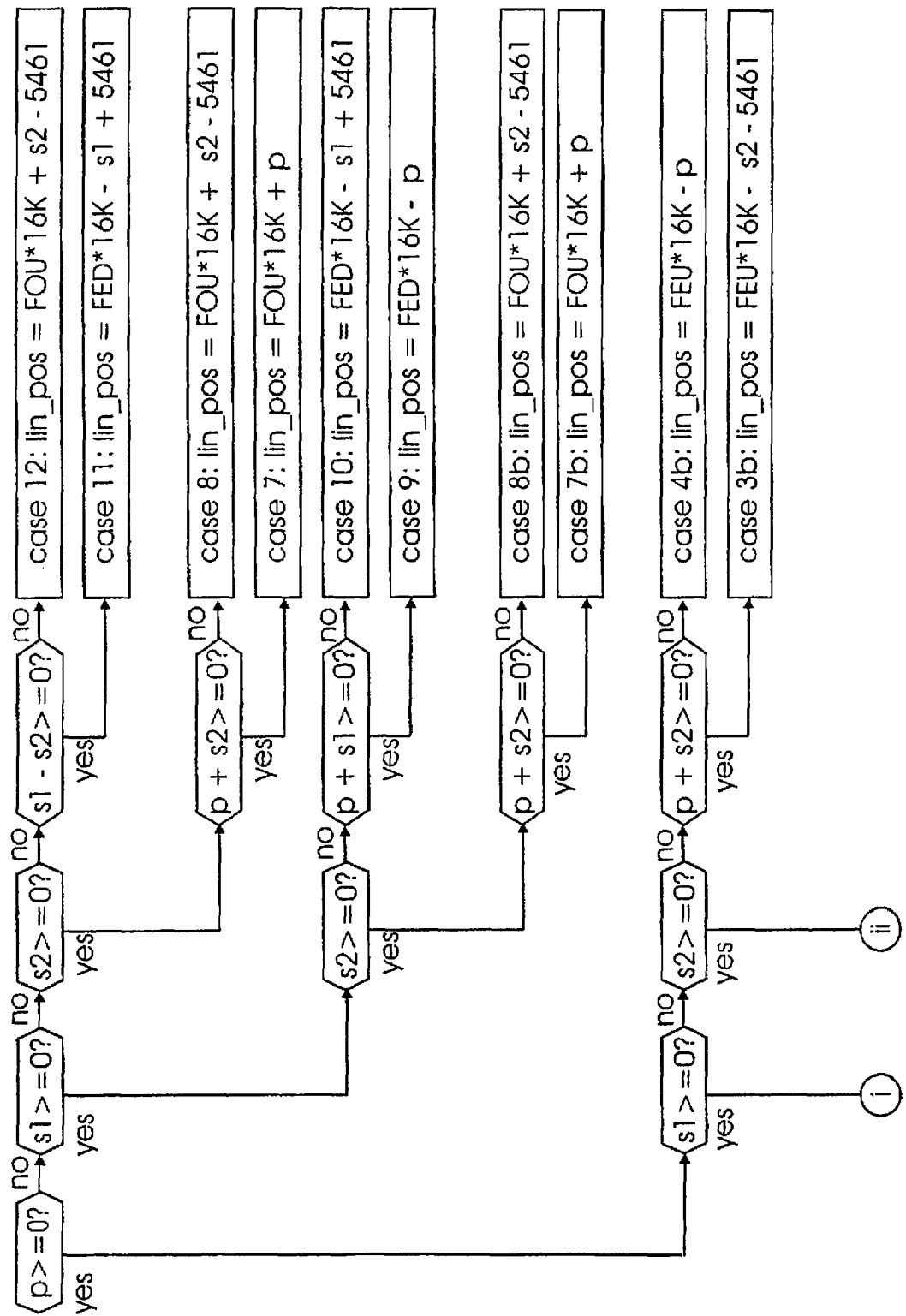
Figure 9-A

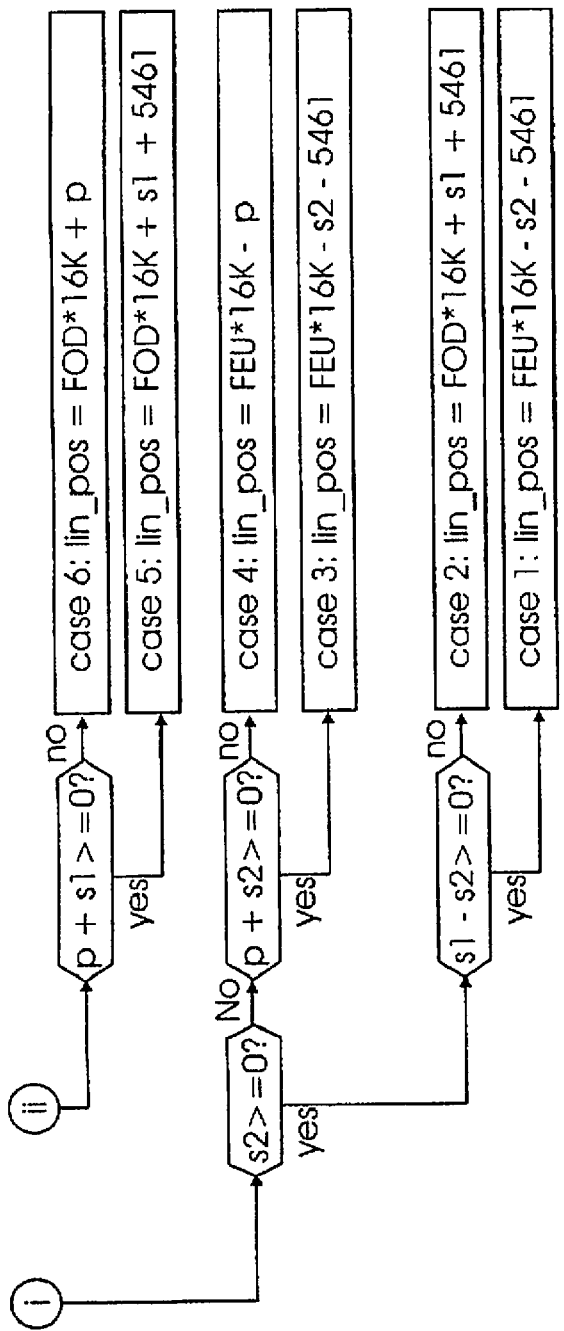
Figure 9-B

METHOD AND SYSTEM FOR HEAD POSITION CONTROL IN EMBEDDED DISK DRIVE CONTROLLERS

CROSS-REFERENCE TO RELATED APPLICATIONS

This application is a continuation of U.S. patent application Ser. No. 11/592,813, filed Nov. 3, 2006, which is a continuation of U.S. patent application Ser. No. 10/793,207, filed Mar. 4, 2004, which claims priority to U.S. Provisional Patent Application No. 60/543,233, filed Feb. 10, 2004, the disclosures of which are incorporated herein by reference in their entirety.

FIELD

The present invention relates generally to storage systems, and more particularly to disk drive servo controllers.

BACKGROUND

Conventional computer systems typically include several functional components. These components may include a central processing unit (CPU), main memory, input/output ("I/O") devices, and disk drives. In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The main memory is typically smaller than disk drives and may be volatile. Programming data is often stored on the disk drive and read into main memory as needed. The disk drives are coupled to the host system via a disk controller that handles complex details of interfacing the disk drives to the host system. Communications between the host system and the disk controller is usually provided using one of a variety of standard I/O bus interfaces.

Typically, a disk drive includes one or more magnetic disks. Each disk (or platter) typically has a number of concentric rings or tracks (platter) on which data is stored. The tracks themselves may be divided into sectors, which are the smallest accessible data units. A positioning head above the appropriate track accesses a sector. An index pulse typically identifies the first sector of a track. The start of each sector is identified with a sector pulse. Typically, the disk drive waits until a desired sector rotates beneath the head before proceeding with a read or write operation. Data is accessed serially, one bit at a time and typically, each disk has its own read/write head.

FIG. 1A shows a disk drive system 100 with platters 101A and 101B, an actuator 102 and read/write head 103. Typically, multiple platters/read and write heads are used. Platters 101A-101B have assigned tracks for storing system information, servo data and user data. Servo patterns are recorded on storage media at manufacturing time. Typically, the servo patterns are recorded at evenly spaced intervals, as shown in FIG. 1B. FIG. 1B shows eight servo fields per track and each track has patterns of information that are described below.

The disk drive is connected to the disk controller that performs numerous functions, for example, converting digital data to analog head signals, disk formatting, error checking and fixing, logical to physical address mapping and data buffering. To perform the various functions for transferring data, the disk controller includes numerous components.

To access data from (or to write data to) a disk drive, the host system must know where to read the data from (or write data to) the disk drive. A driver typically performs this task. Once the disk drive address is known, the address is translated to cylinder, head and sector based on platter geometry and sent to the disk controller. Logic on the hard disk looks at the number of cylinders requested. Servo controller firmware instructs motor control hardware to move read/write heads 103 to the appropriate track. When the head is in the correct position, it reads the data from the correct track.

Typically, read and write head 103 has a write core for writing data in a data region, and a read core for magnetically detecting the data written in the data region of a track and a servo pattern recorded on a servo region.

A servo system 104 detects the position of head 103 on platter 101A according to a phase of a servo pattern detected by the read core of head 103. Servo system 104 then moves head 103 to the target position.

Servo system 104 servo-controls head 103 while receiving feedback for a detected position obtained from a servo pattern so that any positional error between the detected position and the target position is negated.

Conventional servo/embedded controller systems are not efficient in determining the linear position of a head based on the format of servo patterns or determine positional errors based on the linear position and a target's position.

Therefore, what is desired is a method and system for determining the linear position of a head based on the format of servo patterns and determining (and adjusting) positional errors based on the linear position and a target's position.

SUMMARY OF THE INVENTION

In one aspect of the present invention, a track follow controller ("TFC") in an embedded disk controller is provided. The TFC includes, a position error calculator that determines a linear position of a head based on burst format and determines a position error based on the linear position and a target position; and a position error output compensator that receives a position error signal from the position error calculator and filters the position error signal.

The position error is automatically adjusted based on run out correction information. The position error calculator is functionally coupled to the position error output compensator having a single filter or more than one cascaded filters each having reduced input to output delay through use of an anticipation mode.

The position error calculator includes a burst selector that can select a burst pair; a linear position calculator that calculates head linear position based on burst pair format; and an error calculator that determines the position error based on the linear position and target position.

The position error output compensator includes a first filter that receives a position error signal from the position error calculator; and a second filter that receives an input signal from the first filter, where after all calculations are completed for one sample, values are shifted to a holding cell so that calculations can begin for a next sample in anticipation.

In another aspect of the present invention, a position error calculator ("PEC") for an embedded disk controller is provided. The PEC includes a burst selector that can select a burst pair; a linear position calculator that calculates head linear position based on burst pair format; and a position error calculator that determines a position error based on a linear position and target position, and the position error is compared to certain programmable limits.

The position error is automatically adjusted based on run out correction information. Also, the position error output calculator is functionally coupled to a position error compensator having a single filter or more than one cascaded filters each having reduced input to output delay through use of an anticipation mode.

In yet another aspect of the present invention, a position error output compensator used in an embedded disk controller is provided. The position error output compensator includes a first filter that receives a position error signal from a position error calculator; and a second filter that receives an input signal from the first filter, where after all calculations are completed for one sample, values are shifted to a holding cell so that calculations can begin for a next sample in anticipation. The first filter is a five-tap filter and the second filter is a seven-tap filter and both the filters use a single multiply accumulation block.

In yet another aspect of the present invention, a method for determining position error for a head in used by an embedded disk controller to read and/or write data to a storage media is provided. The method includes determining a difference between a head linear position and a target position for a four and/or six burst format; and generating a preliminary position error signal.

In one aspect of the present invention the process and system automatically calculate linear position based on burst values. Both four and six burst formats are supported. Bursts pairs may be arranged in any order.

In yet another aspect of the present invention, position error signal is automatically calculated based on linear position and target position. The position error signal is automatically compared to several programmable limits, and several programmable values can be substituted when the error signal is outside of these limits.

In yet another aspect of the present invention, the position error calculation is automatically adjusted based on either recorded or electronically stored Run Out Correction (ROC) information.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described. In the drawings, the same components have the same reference numerals. The illustrated embodiment is intended to illustrate, but not to limit the invention. The drawings include the following Figures:

FIGS. 9A and 9B illustrate a flow chart for determining the head linear position for a six-burst format;

DETAILED DESCRIPTION OF THE PREFERRED EMBODIMENTS

To facilitate an understanding of the preferred embodiment, the general architecture and operation of an embedded disk controller will be described initially. The specific architecture and operation of the preferred embodiment will then be described.

Figure 1A:
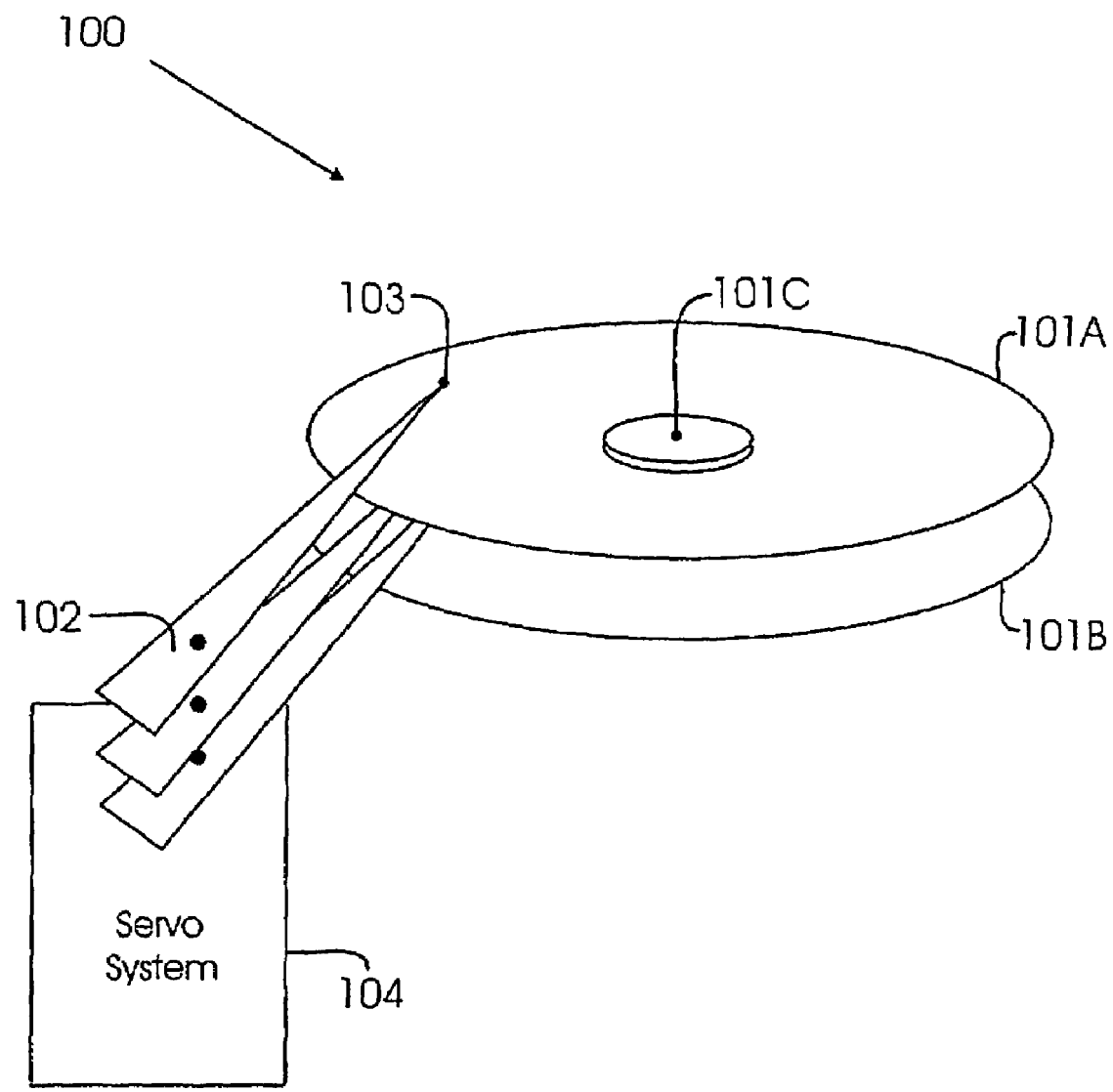
FIG. 1A shows a block diagram of a disk drive.
Figure 1B:
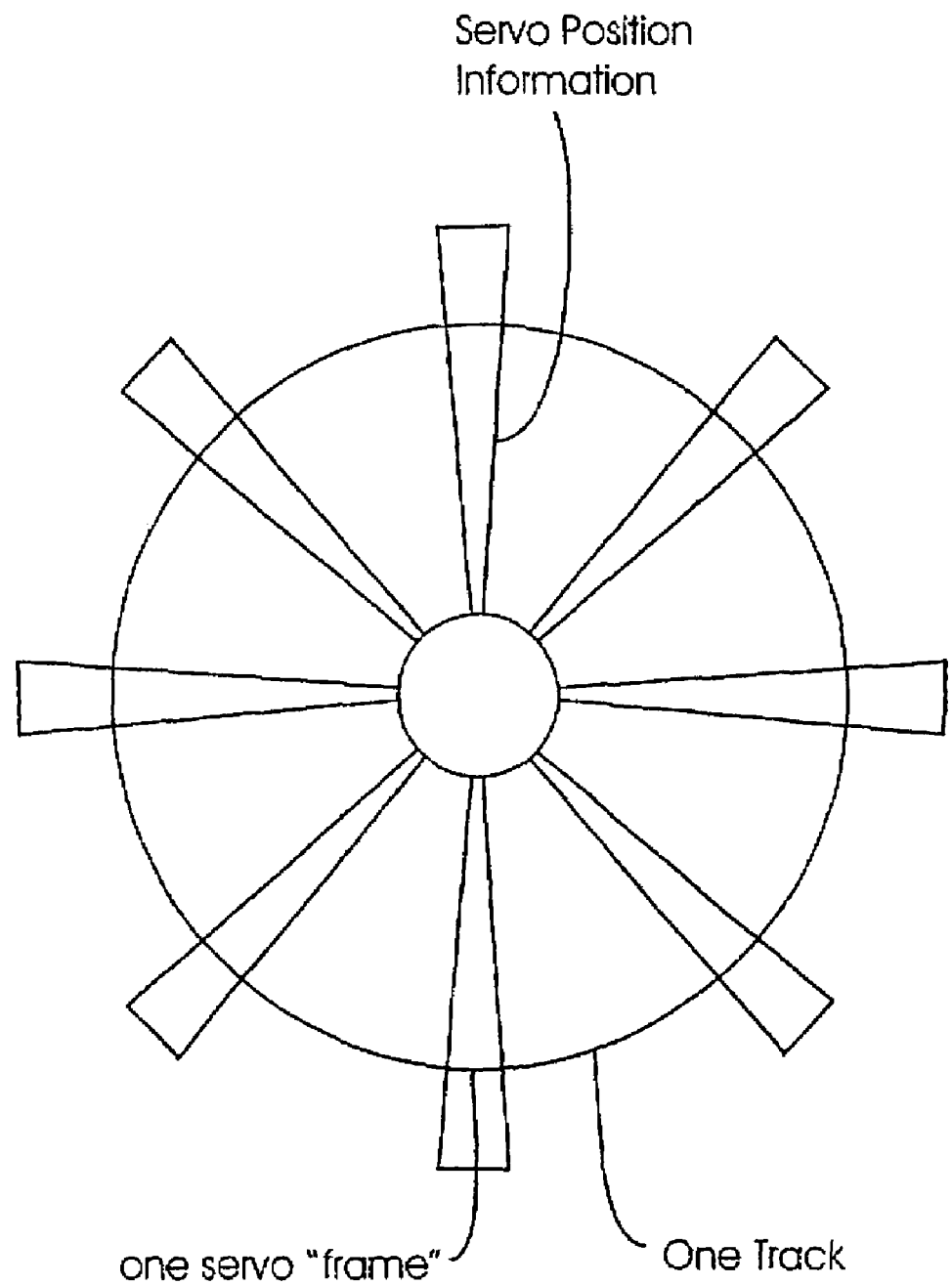
FIG. 1B shows a diagram of a disk platter with saved servo information.
Figure 2:
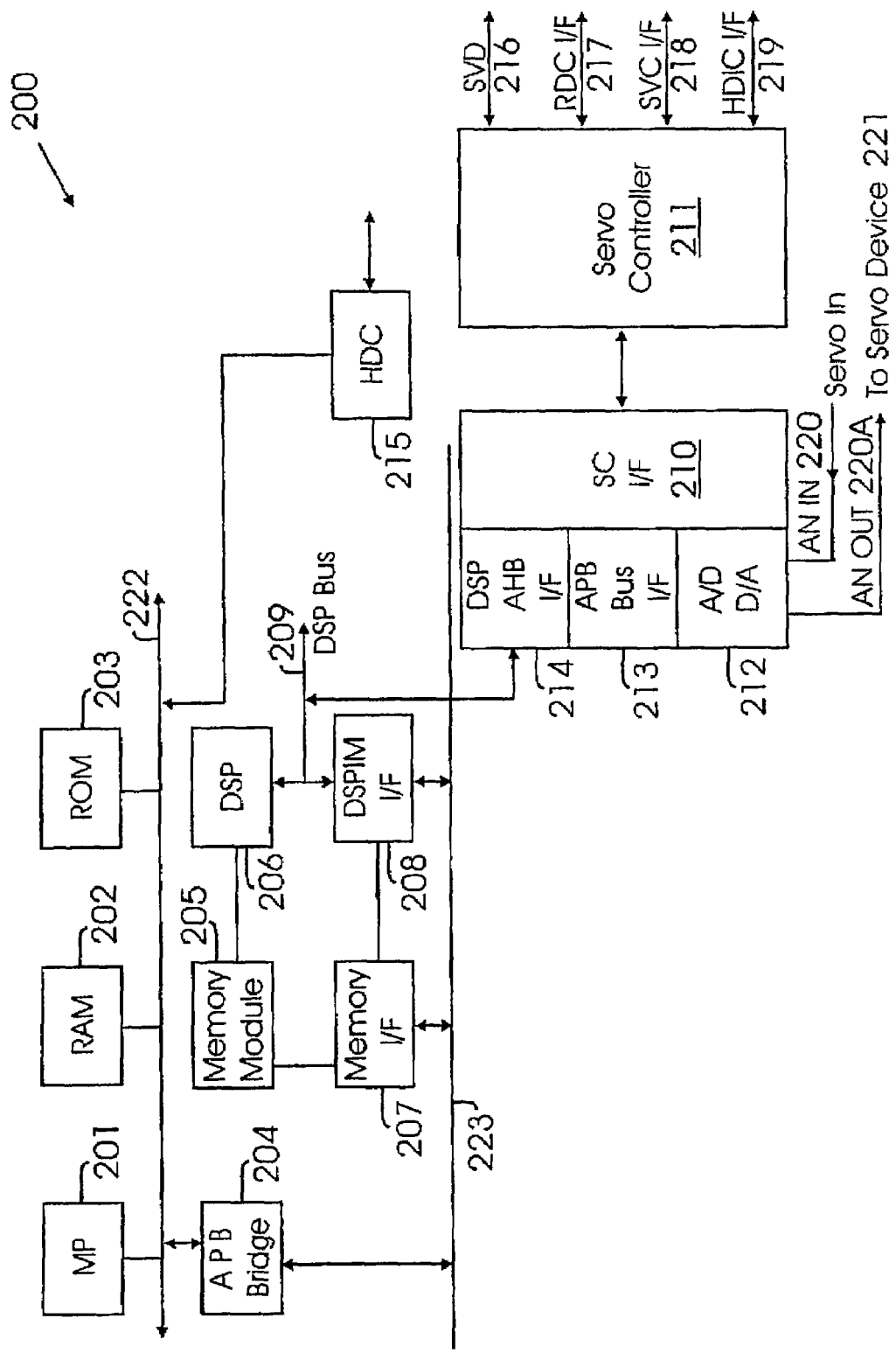
FIG. 2 is a block diagram of an embedded disk controller system, according to one aspect of the present invention.

FIG. 2 shows a block diagram of an embedded disk controller system 200 according to one aspect of the present invention. System 200 may be an application specific integrated circuit ("ASIC").

System 200 includes a microprocessor ("MP") 201 that performs various functions described below. MP 201 may be a Pentium® Class processor designed and developed by Intel Corporation® or an ARM processor. MP 201 is operationally coupled to various system 200 components via buses 222 and 223. Bus 222 may be an Advance High performance (AHB) bus as specified by ARM Inc. Bus 223 may be an Advance Peripheral Bus ("APB") as specified by ARM Inc. The specifications for AHB and APB are incorporated herein by reference in their entirety.

System 200 is also provided with a random access memory (RAM) or static RAM (SRAM) 202 that stores programs and instructions, which allows MP 201 to execute computer instructions. MP 201 may execute code instructions (also referred to as "firmware") out of RAM 202.

System 200 is also provided with read only memory (ROM) 203 that stores invariant instructions, including basic input/output instructions.

System 200 is also provided with a digital signal processor ("DSP") 206 that controls and monitors various servo functions through DSP interface module ("DSPIM") 208 and servo controller interface 210 operationally coupled to a servo controller ("SC") 211.

DSPIM 208 interfaces DSP 206 with MP 201 and allows DSP 206 to update a tightly coupled memory module (TCM)

205 (also referred to as "memory module" 205) with servo related information. MP 201 can access TCM 205 via DSPIM 208.

Servo controller interface ("SCI") 210 includes an APB interface 213 that allows SCI 210 to interface with APB bus 223 and allows SC 211 to interface with MP 201 and DSP 206.

SCI 210 also includes DSPAHB interface 214 that allows access to DSPAHB bus 209. SCI 210 is provided with a digital to analog and analog to digital converter 212 that converts data from analog to digital domain and vice-versa. Analog data 220 enters module 212 and leaves as analog data 220A to a servo device 221.

SC 211 has a read channel device ("RDC") serial port 217, a motor control ("SVC") serial port 218 for a "combo" motor controller device, a head integrated circuit (HDIC) serial port 219 and a servo data ("SVD") interface 216 for communicating with various devices.

Figure 3:
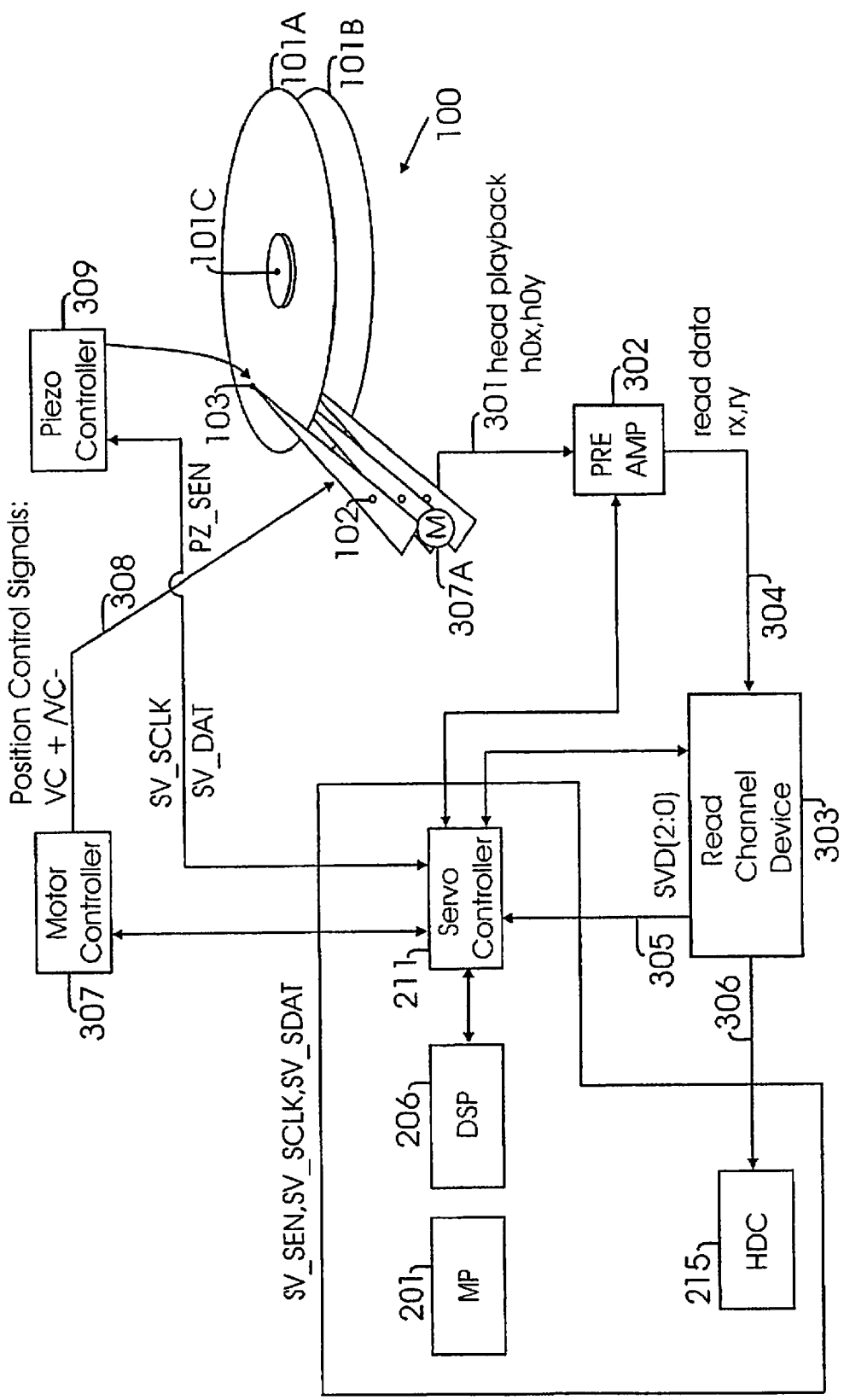
FIG. 3 is a block diagram showing the various components of the FIG. 2 system and a two-platter, four-head disk drive, according to one aspect of the present invention.

FIG. 3 shows a block diagram with disk 100 coupled to system 200, according to one aspect of the present invention. FIG. 3 shows a read channel device 303 that receives signals from a pre-amplifier 302 (also known as head integrated circuit (HDIC)) coupled to disk 100. Marvell Semiconductor Inc. manufactures one example of a read channel device 303®, Part Number 88C7500, while pre-amplifier 302 may be a Texas instrument, Part Number SR1790. Pre-amplifier 302 is also operationally coupled to SC 211. Servo data ("SVD") 305 is sent to SC 211.

A motor controller 307 (also referred to as device 307), (for example, a motor controller manufactured by Texas Instruments®, Part Number SH6764) sends control signals 308 to control actuator movement using motor 307A. It is noteworthy that spindle 101C is controlled by a spindle motor (not shown) for rotating platters 101A and 101B. SC 211 sends plural signals to motor controller 307 including clock, data and "enable" signals to motor controller 307 (for example, SV_SEN, SV_SCLK and SV_SDAT).

SC 211 is also operationally coupled to a piezo controller 309 that allows communication with a piezo device (not shown). One such piezo controller is sold by Rolm Electronics®, Part Number BD6801 FV. SC 211 sends clock, data and enable signals to controller 309 (for example, PZ_SEN, SV_SCLK and SV_SDAT).

Figure 4:
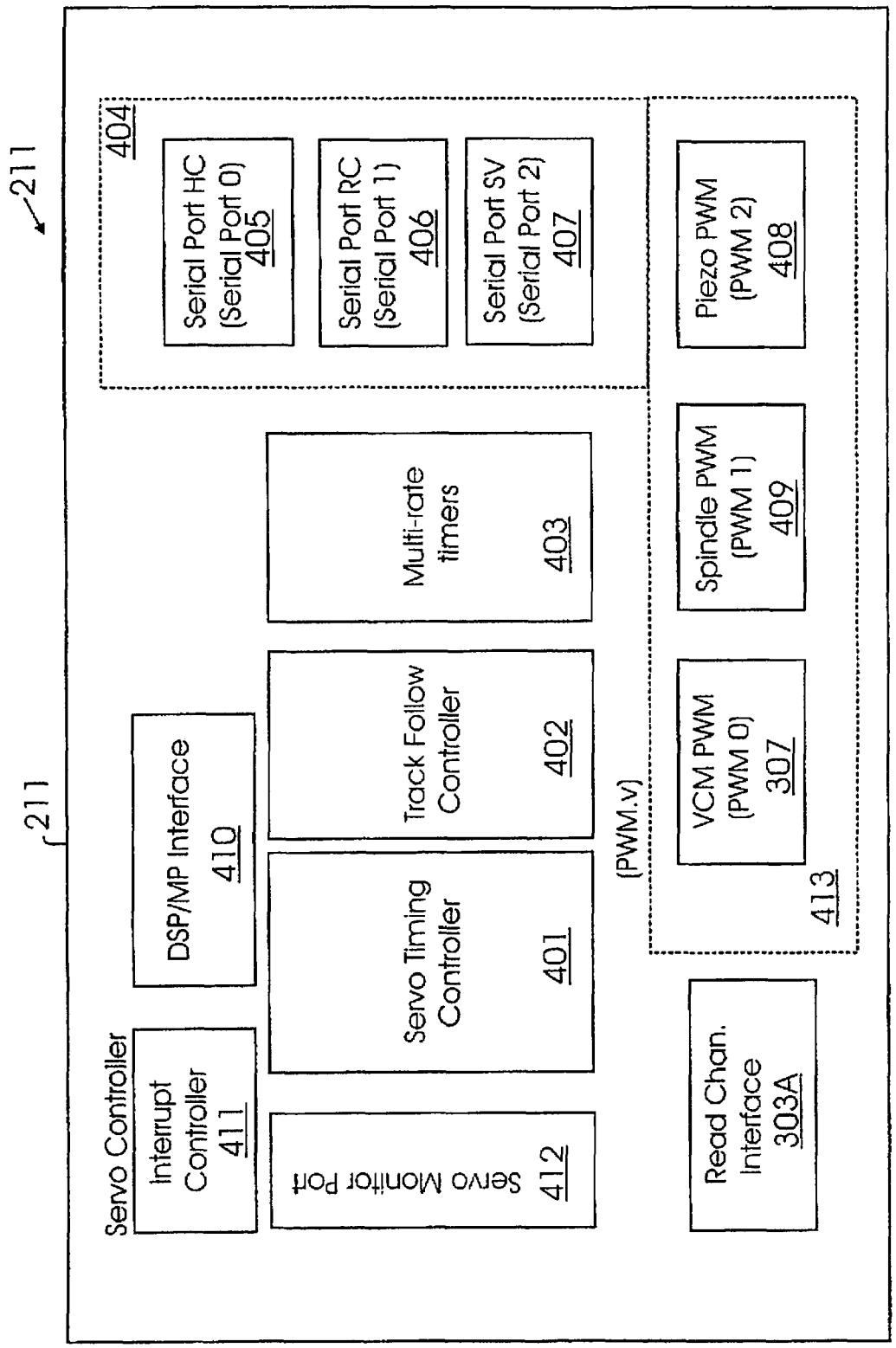
FIG. 4 is a block diagram of a servo controller, according to one aspect of the present invention.

FIG. 4 shows a block diagram of SC 211, according to one aspect of the present invention. FIG. 4 shows SC 211 with a serial port controller 404 for controlling various serial ports 405-407. SC 211 also has a servo-timing controller ("STC") 401 that automatically adjusts the time base when a head change occurs. Servo controller 211 includes an interrupt controller 411 that can generate an interrupt to DSP 206 and MP 201. Interrupts may be generated when a servo field is found (or not found) and for other reasons. SC 211 includes a servo monitoring port 412 that monitors various signals to SC 211.

SC 211 uses a pulse width modulation unit ("PWM") 413 for supporting control of motor 307A PWM, and a spindle motor PWM 409 and a piezo PWM 408.

MP 201 and/or DSP 206 use read channel device 303 for transferring configuration data and operational commands through SC 211 (via read channel serial port interface 303A). SC 211 also includes a multi-rate timer module 403 for controlling various timing operations involving SC 211 and other components.

In one aspect of the present invention, SC 211 includes a track follow controller ("TFC") 402 for determining the linear position of a head based on format of servo patterns and determining/adjusting positional errors based on the linear position and target position.

SC 211 uses the following registers whose values are used in various adaptive aspects of the present invention, as discussed below:

(a) KpReg: Kp Register (Read/Write, Address offset 2D4h): This register allows a user to apply a "Strength factor" for each head. The strength factor can be used to increase the gain of the position detection signal path for a weaker head.

(b)ROReg: Run Out Correction Register (Read/Write, Address offset 320h): This register allows a user to apply a run out correction factor from firmware, as described below.

(c) ULLReg: Lock Upper Limit Register (Read/Write, Address offset 304h): This register defines the upper "locked on track" limits.

(d) LLLReg: Lock Lower Limit Register (Read/Write, Address offset 300h): This register defines the lower "locked on track" limits.

(e) TPOSReg: Target Position Register (Read/Write, Address offset 4A0h): This register is used to set a current target position.

(e) Gain Register (with respect step S1301, FIG. 13) is the same as the PES gain register.

(f) PGReg: PES Gain Register (Read/Write, Address offset 4A8h): This register provides the PES gain outside of the "locked" limits.

(g) PLGReg: PES Locked Gain Register (Read/Write, address offset 4BCh): This register gives the PES gain inside of "locked" limits.

(h) TFCReg: Track Follow Control Register (Address offset 2C0h): This is a global control register for TFC 402.

(i) DOSReg: DACval Offset Register (Read/Write, Address offset 2F4h): This register can be used to set a value for the DAC offset.

(j) LOUTReg: Last Output Register (Read only, Address offset 31Ch): The register provides the "previous (last) linear position head output".

(k) COUTReg: Current Output Register (Read/Write, Address offset 318h): The register provides the "current linear position head output".

Figure 5A:
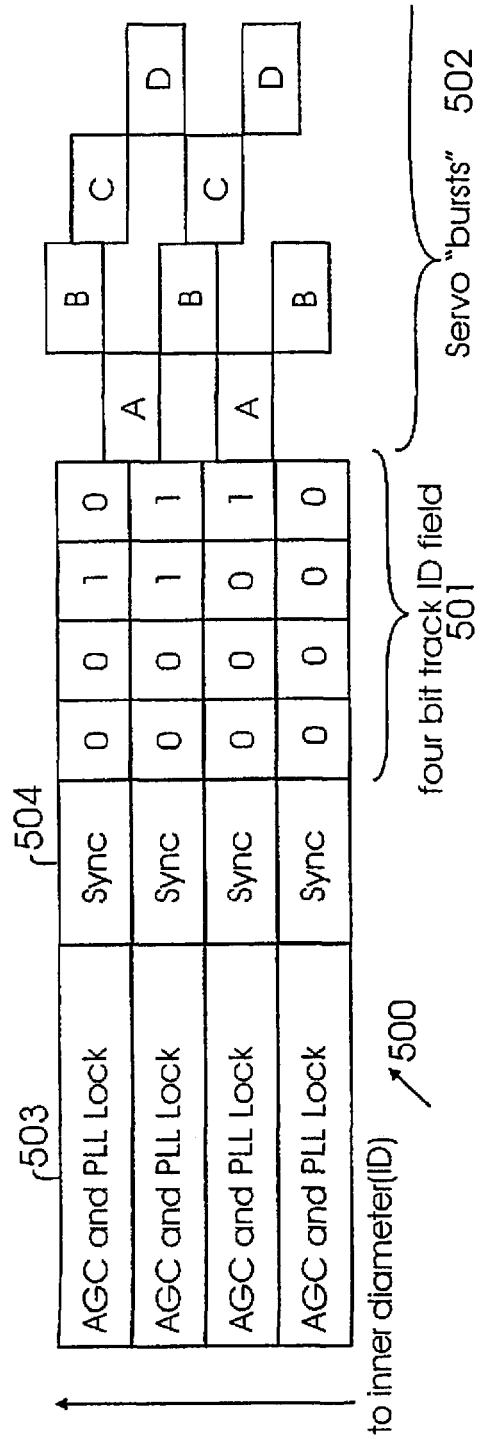
FIG. 5A shows a four-burst servo data format used according to one aspect of the present invention.

Before discussing the various adaptive aspects of TFC 402, the following provides a description of how linear position is determined based on servo data format. FIG. 5A shows the format of servo data pattern 500 with various fields. Pattern 500 includes a constant frequency field 503 for automatic gain control ("AGC") and phase lock loop ("PLL") frequency acquisition. Synchronous pattern 504 occurs after field 503. A four-bit track identification ("ID") 501 contains a digital number that indicates a current track position. It is noteworthy that an 18-bit ID field may be used to identify the track position.

Pattern 500 includes a "servo burst" pattern (also referred to as "burst") 502 with a data pattern "ABCD". Burst 502 is commonly referred to as a "four burst quadrature", since four bursts are recorded. The bursts (i.e., A, B, C and D) are offset from each other by one quarter of a two-track cycle, i.e., C burst is offset from A by one-half track width, and B is offset from C by one half-track width.

Figure 6A:
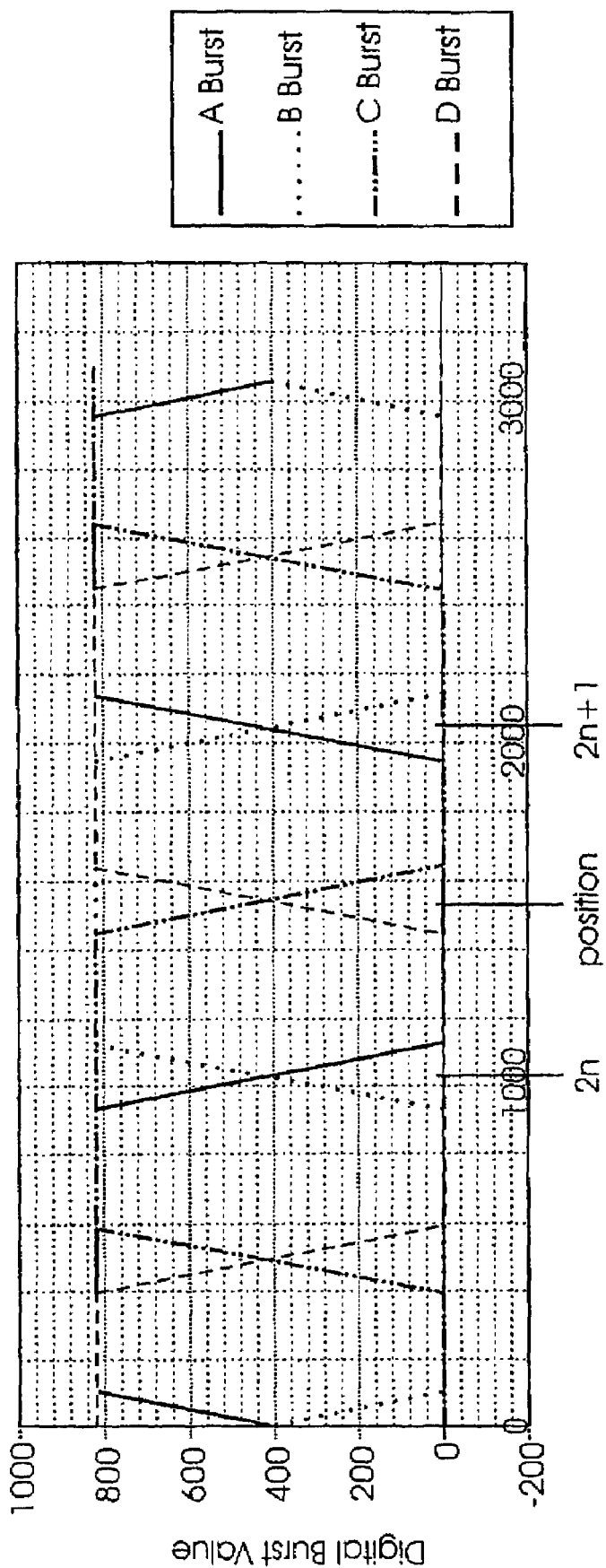
FIG. 6A shows a graphical illustration of digital burst values for a four-burst servo data format.

When head 103 moves from the Outer diameter (OD) track toward the Inner Diameter (ID) track, A, B, C and D burst information plays back a waveform similar to the one shown in FIG. 6A. Information in pattern 500 can be used to construct a digital number that represents head 103's position as shown by the process flow diagram of FIG. 8, which is well known in the art. The following abbreviations are used in the flow diagram of FIG. 8:

FOD: Forces Odd Track Down (If odd, do nothing. If even, subtract one.)

FOU: Forces Odd Track UP (If odd, do nothing. If even, add one.)

FEU: Forces Even Track Up (If even, do nothing. If odd, add one.)

FED: Forces Even Track Down (If even, do nothing. If odd, subtract one.)

P=Primary Position s1=Secondary Position

Burst 0=A digital number that is proportional to the voltage amplitude of the A Burst Burst 1=A digital number that is proportional to the voltage amplitude of the B Burst Burst 2=A digital number that is proportional to the voltage amplitude of the C Burst Burst 3=A digital number that is proportional to the voltage amplitude of the D Burst RTKID=Recovered Track ID Kp=The value contained in the Kp register (not shown) located in SC 211

Figure 7:
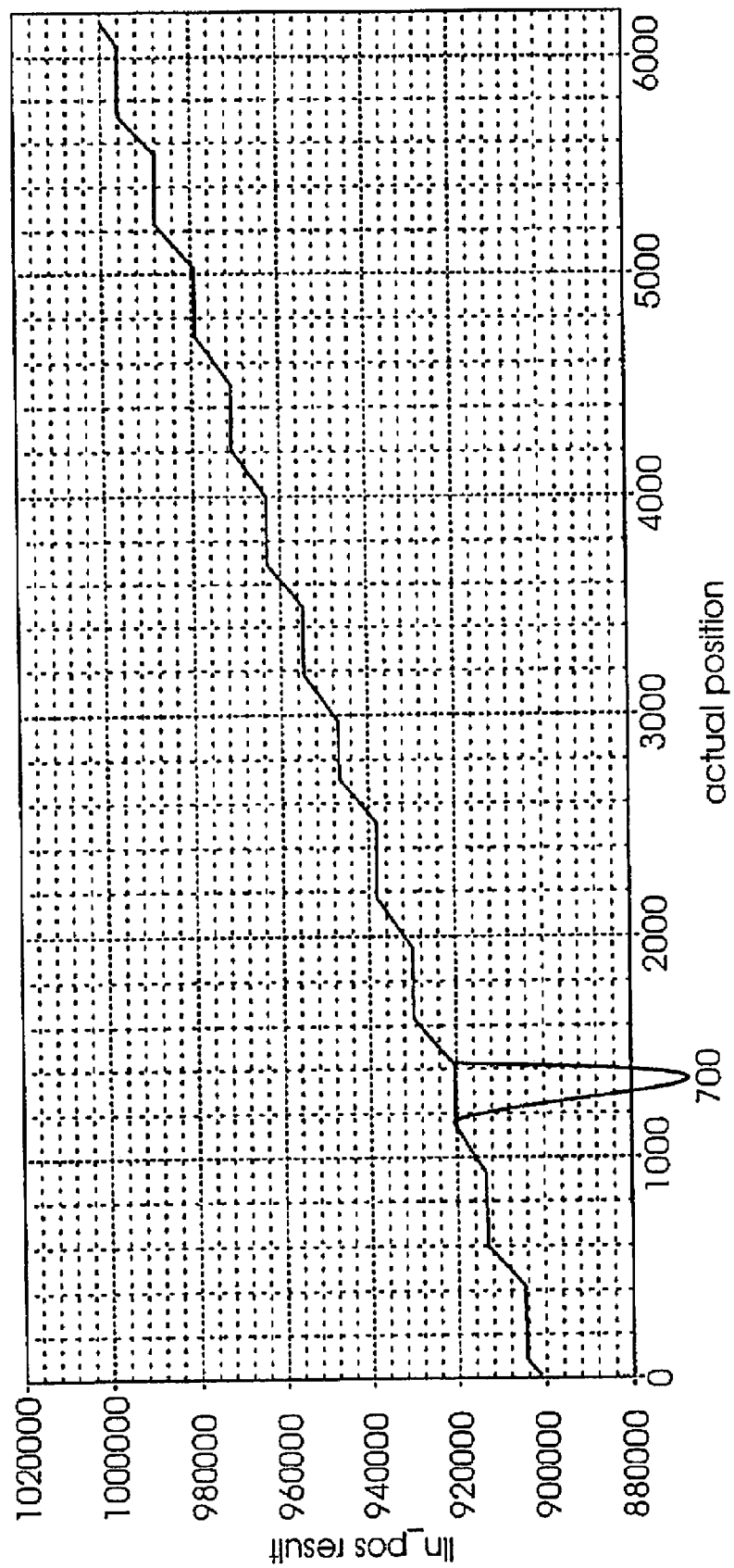
FIG. 7 shows a graphical illustration of actual position and linear position for a four-burst servo data format.
Figure 8:
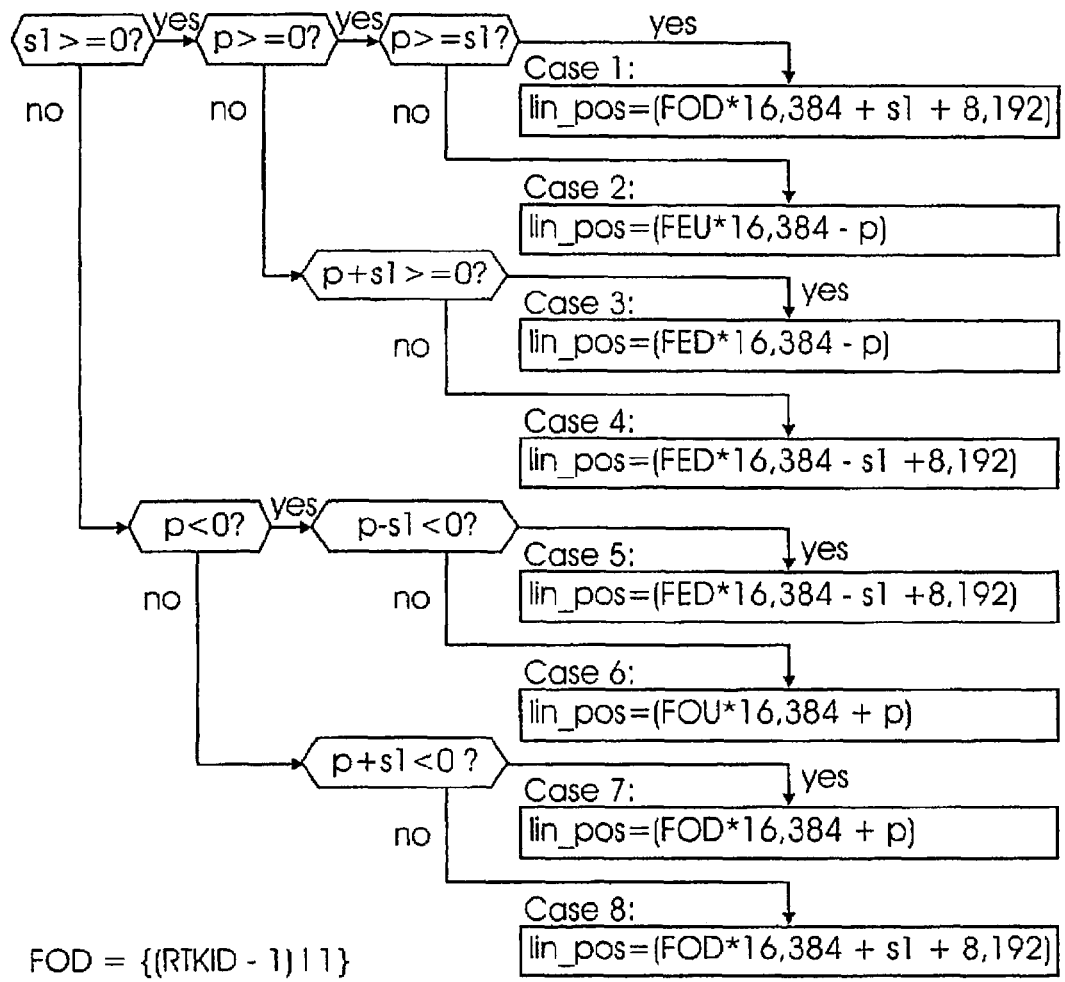
FIG. 8 is a flow chart for determining the head linear position for a four-burst format.

Linear position determined from FIG. 8 is graphically illustrated in FIG. 7. The flat segment 700 through out the graph provides the micro-position of head 103. It is desirable to minimize the length of the flat segment 700 and hence it is common to use a six burst pattern to improve the linearity of the position information (as shown in FIG. 7).

Figure 5B:
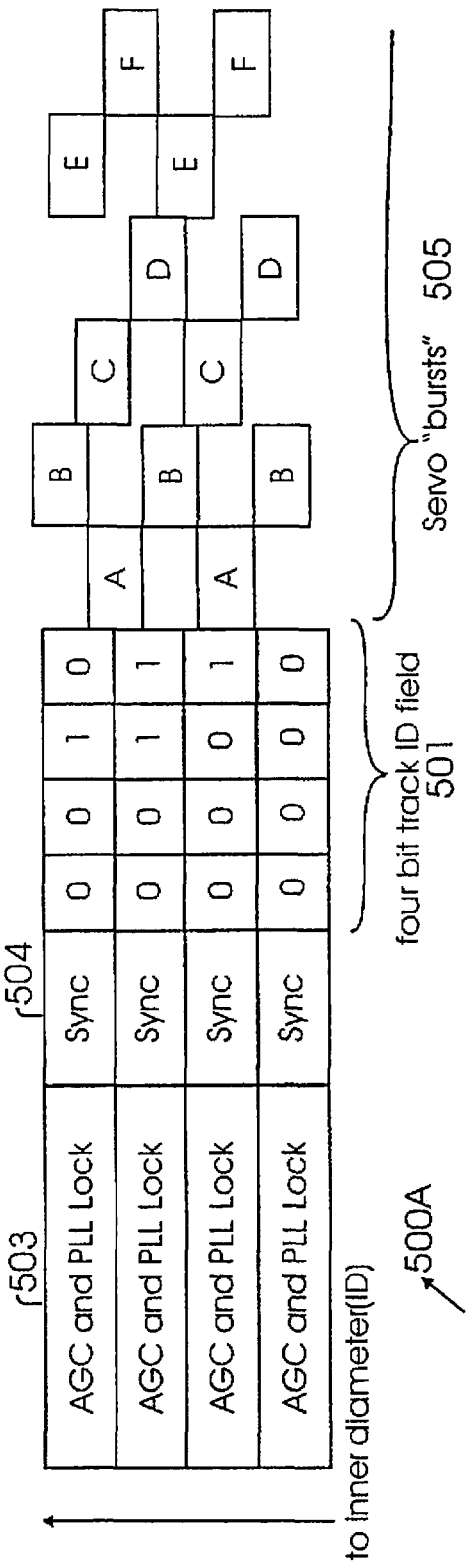
FIG. 5B shows a six-burst data format, used according to one aspect of the present invention.
Figure 6B:
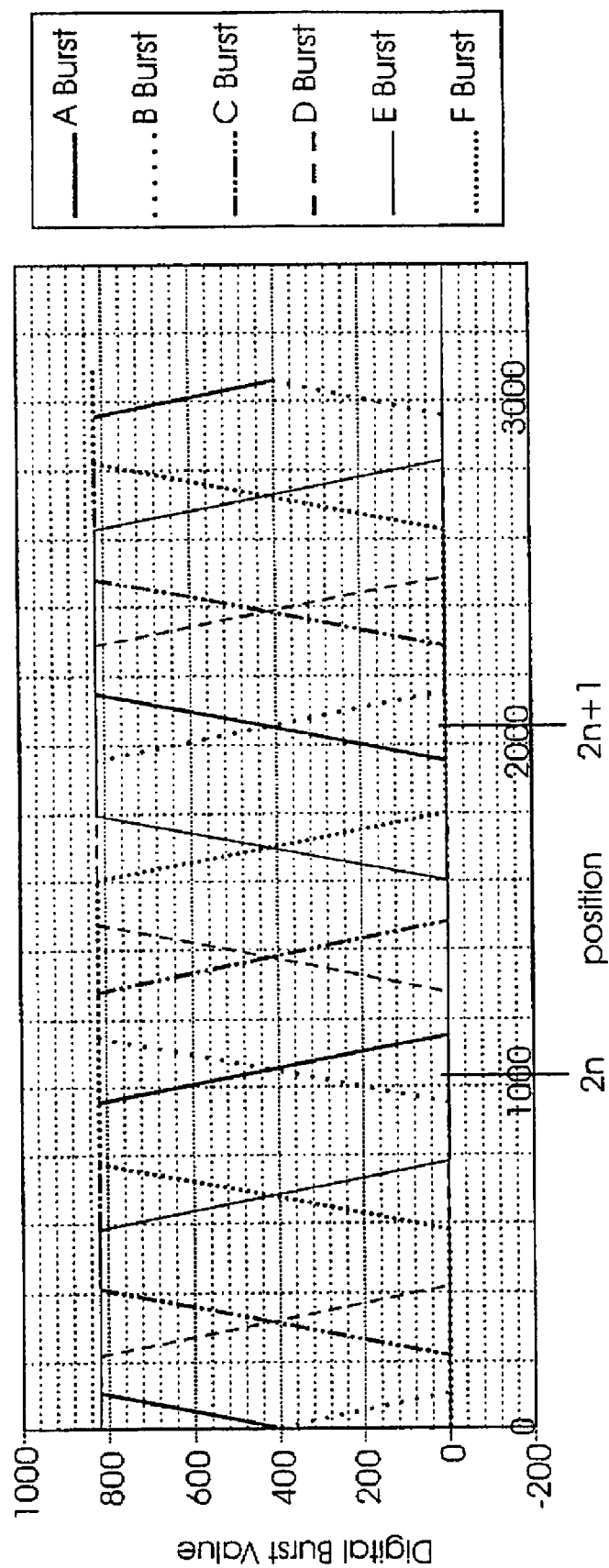
FIG. 6B shows a graphical illustration of digital burst values for a six-burst servo data format.

A six burst pattern is shown in FIG. 5B as 500A, where the servo bursts 505 are shown as A, B, C, D, E and F. A six burst playback waveform is shown in FIG. 6B.

Figure 10:
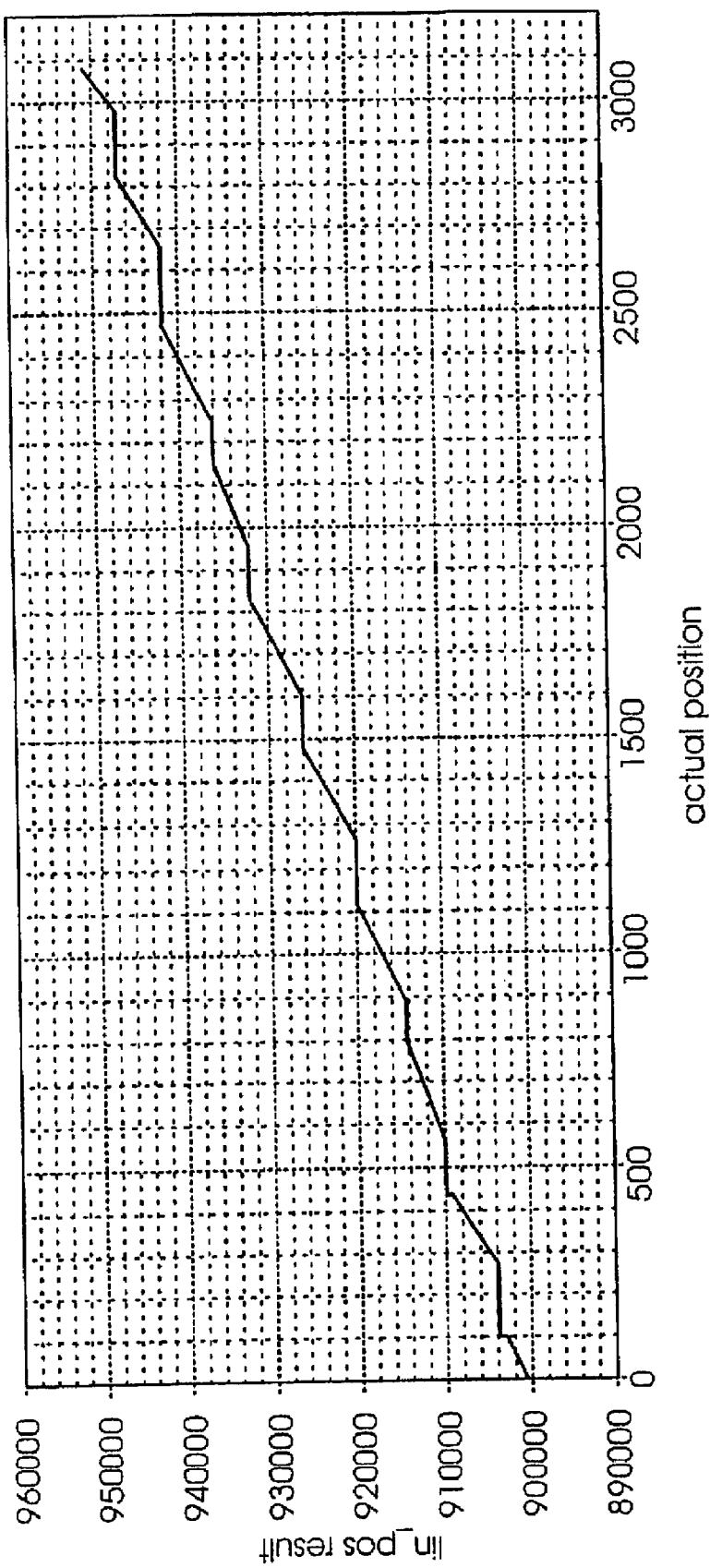
FIG. 10 shows a graphical illustration of actual position and linear position for a six-burst servo data.

FIGS. 9A & 9B show a flow diagram for determining the linear position using a six-burst format 505. The linear position is graphically illustrated in FIG. 10. As shown in FIG. 10, the linearity improves with a six-burst format 505 versus a four-burst format 502. However, the six-burst format 505 occupies more area than the four-burst format. Hence it is desirable to automatically determine the linear position for both the four and six burst format.

Figure 11:
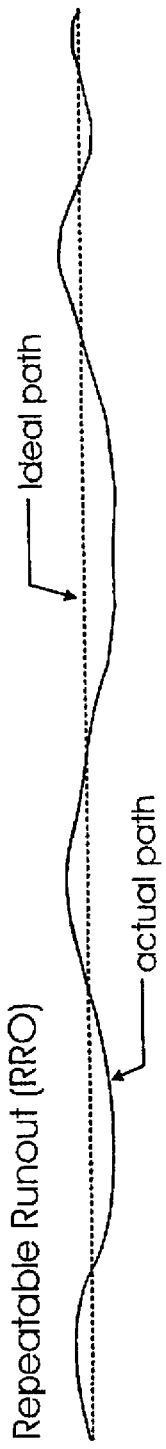
FIG. 11 shows a graphical illustration of repeatable runout.

Another term that is used below to describe the adaptive aspects of the present invention is repeatable runout ("RRO"). This is shown in FIG. 11 as the difference between the ideal and actual path of head 103. If RRO is known, then the calculated head 103 position can be adjusted, as discussed below.

Track Follow Controller 402:

In one aspect of the present invention, TFC 402 is provided to accurately perform position error and correction calculations required to control head position. TFC 402 operates with both 4 or 6 burst formats with a position error of up to four tracks in range; automatically selects the correct burst pair based on position information; automatically applies run out correction factor (ROC) recovered from the servo field; runs in standard or multi-rate modes (controlled by multi-rate timer 403); checks the position error before calculation of correction output and performs compensation on position error to calculate the correction output.

Figure 12A:
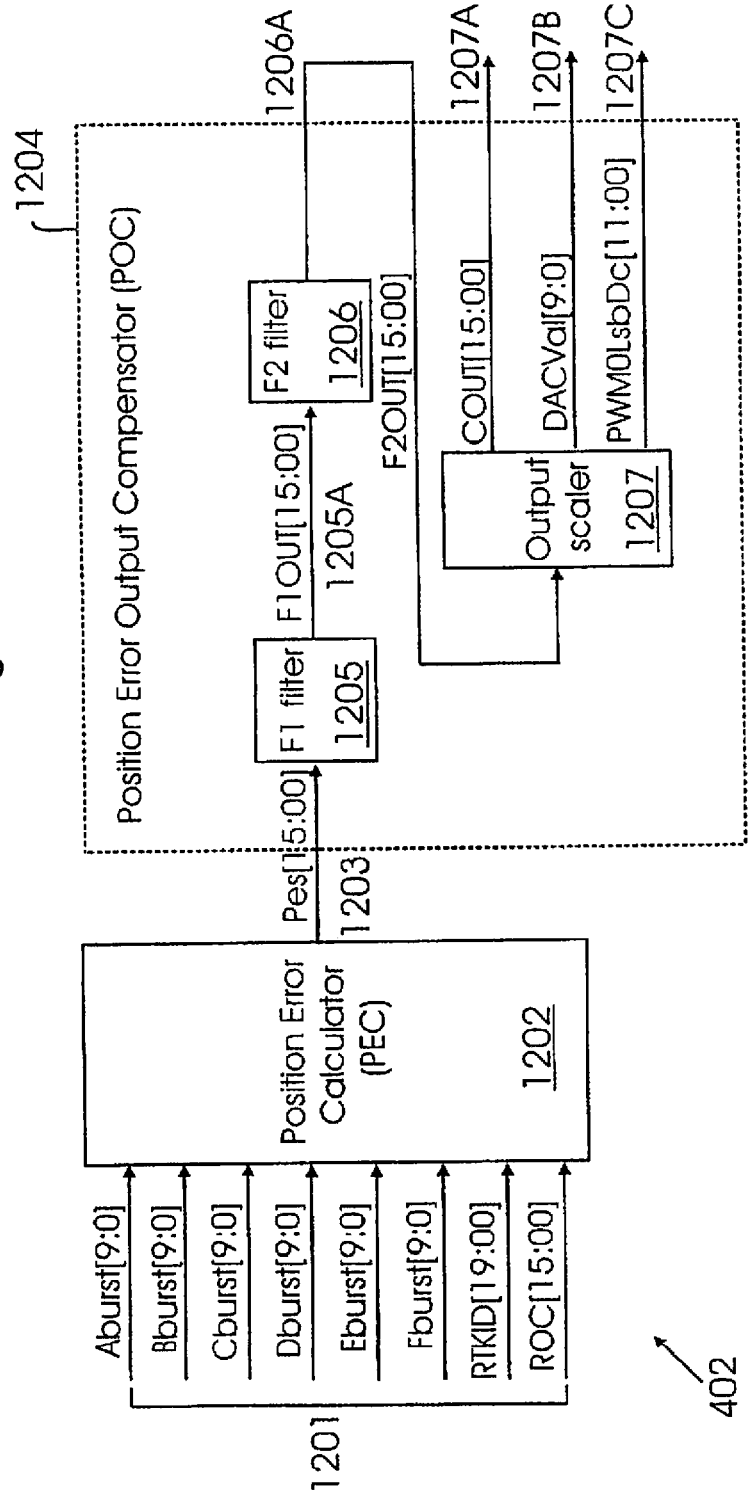
FIG. 12A shows a block diagram of a track flow controller, according to one aspect of the present invention.

FIG. 12A shows a block diagram of TFC 402, according to one aspect of the present invention. TFC 402 includes a position error calculator ("PEC") 1202 and a position error output compensator ("POC") 1204. PEC 1202 converts a current head 103 position into a position error signal (Pes 1203).

Figure 12B:
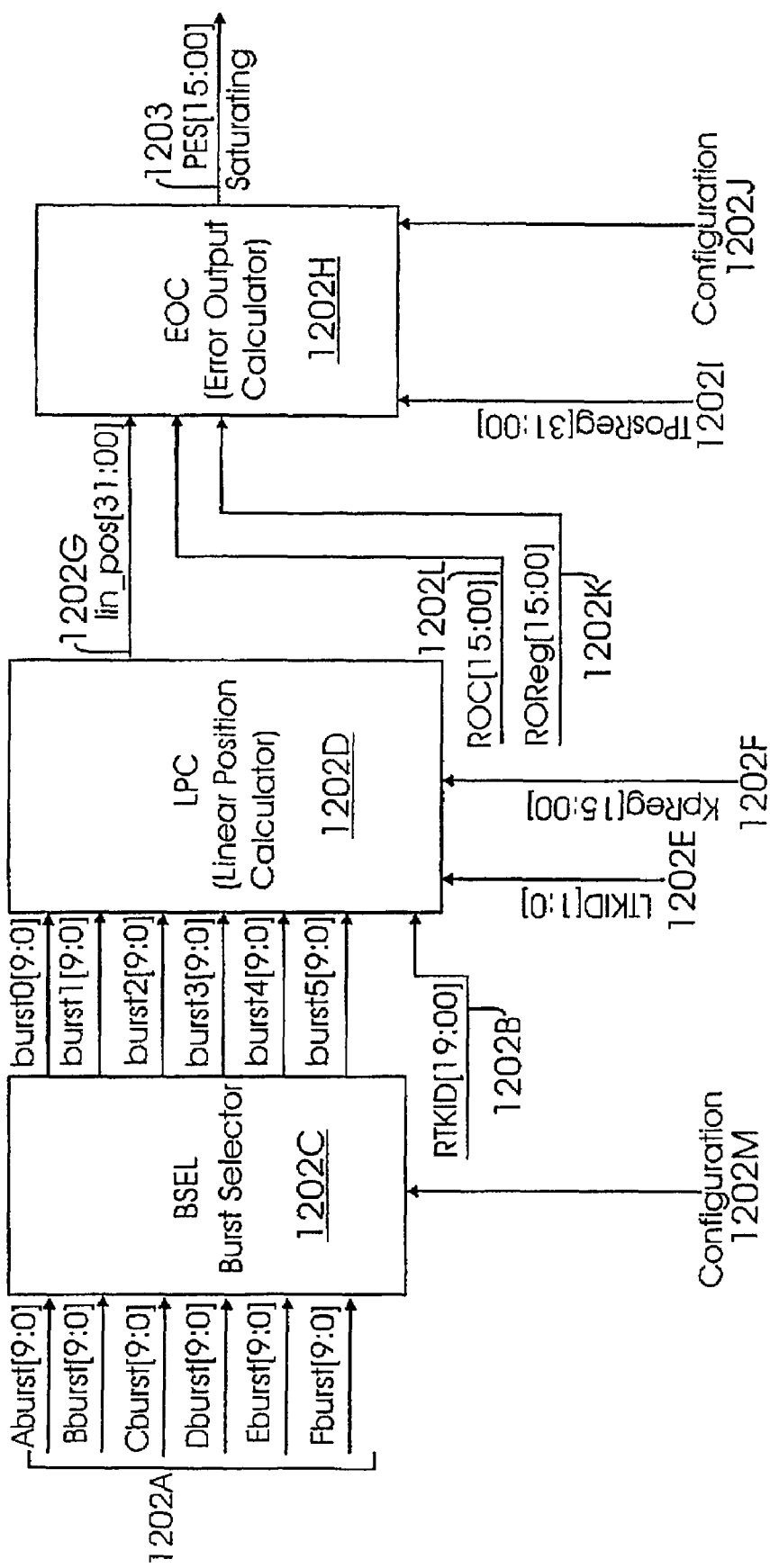
FIG. 12B shows a block diagram of a position error calculator, according to one aspect of the present invention.

FIG. 12B shows a block diagram of PEC 1202 with a burst selector module 1202C, linear position calculator ("LPC") 1202D and error output calculator ("EOC") 1202H. Burst data 1202A is received by burst selector (BSEL) 1202C that also receives configuration information 1202M. BSEL 1202C selects a burst pair, for example, A-B, C-D, or E-F. The burst pair from BSEL 1202C is sent to LPC 1202D. LPC 1202D also receives recovered track ID ("RTKID") 1202B from the read channel, length of track ID ("LTKID") 1202E from a programmable register and a Kp value 1202F from programmable Kp register.

LPC 1202D supports both four and six burst position error calculations. LPC 1202D uses the output from BSEL 1202C to calculate the intermediate results for primary position (p_pos) and the secondary positions (s1_pos and s2_pos), as shown in FIGS. 8 and 9. Linear position (lin_pos) is a 34-bit value with 20 bits for track ID and 14 bits for head 103 micro position value.

LPC 1202D uses burst 0 and burst 1 to determine the primary position (p-pos), which is used during track follow. Burst 0 and 1 are called the primary pair. When the output of primary pair becomes nonlinear in the positive direction, LPC 1202D automatically switches over to the "upper limit pair" i.e. (burst2 and burst3) and the secondary upper limit position (s1_pos). Likewise, when the primary pair becomes nonlinear in the negative direction, LPC 1202D automatically switches over to the "lower limit pair" (burst4 and burst5) and the secondary lower limit position (s2_pos).

BSEL 1202C uses register programming to select which burst pair is the "lower limit pair" (LL_pair, burst4 and burst5), the "upper limit pair" (UL_pair, burst2 and burst3), or the "track follow pair" (TF_pair, burst0 and burst1).

BSEL module 1202C consists of multiplexers that are used to select the required bursts from among the recovered bursts. This approach supports both four and six burst formats. By programming LPC 1202D and BSEL 1202C modules, any order of burst pairs can be used for both four and six burst formats.

Linear position (lin_pos) 1202G as determined by LPC 1202D is sent to EOC 1202H that determines the position error signal (PES) 1203 based on lin_pos 1202G and target position 1202I from DSP 206. EOC 1202H also receives ROC 1202K value and run out correction register value 1202L. Configuration information 1202J from DSP 206 is used to configure EOC 1202H.

Figure 13:
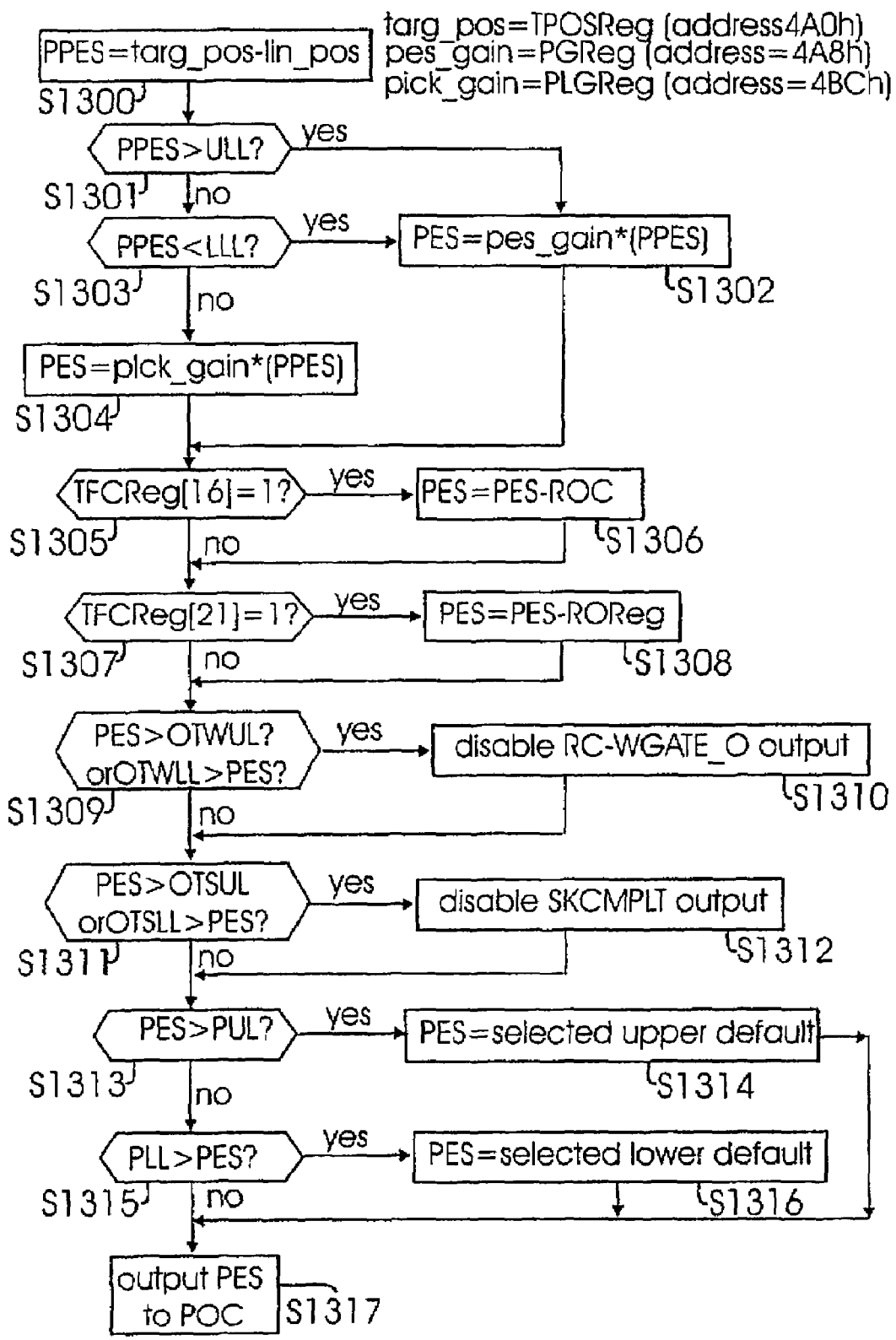
FIG. 13 shows a flow diagram for determining error, according to one aspect of the present invention.

FIG. 13 shows a process flow diagram for determining the error output (PES). Turning in detail to FIG. 13, in step S1300, EOC 1202H subtracts the lin_Pos from a target position recovered from DSP 206 to obtain a Preliminary PES ("PPES"). EOC 1202H subtracts the linear position (lin_pos) from a programmed target position 1202I. The target position may be stored in a register located in DSP 206 and in one aspect, it is a 34-bit value that includes a 20 bit track ID value and a 14 bit micro position value. The most significant bits of the target position can be set using the register in DSP 206.

In step S1301, PPES is compared to a Upper Lock Limit ("ULL") register value. If the PPES value is less than the ULL, then in step S1303, PPES is compared to a Lower Lock Limit ("LLL") register value. If PPES is greater than ULL or less than LLL, then in step S1302, PPES is multiplied by contents of a gain register to determine the actual PES. The ULL and LLL values can be symmetrical or asymmetrical.

In step S1304, if PPES is within the ULL and LLL register values, it is multiplied by the contents of a Locked Gain register.

In step S1305, the process determines if a run out correction ("ROC") factor is needed. This is done by checking if a control register bit is set. If the bit is set, then ROC from the media is subtracted in step S1306 and the process moves to step S1307.

If correction is to be performed by using a pre-programmed value (from firmware), then a pre-programmed value (from RO register) is subtracted in step S1308.

In step S1309, the PES value is compared to off-track write upper limit (OTWUL) value and the lower limit value ("OTWLL"). If the PES is greater than OTWUL value or if the OTWLL is greater than PES, then writing is disabled in step S1310.

In step S1311, the PES value is compared to an off track seek upper limit ("OTSUL") value and lower limit ("OTSLL"). If PES is greater than OTSUL or less than OTSCLL, then reading is disabled in step S1312.

In step S1313, PES is compared to PES output upper limit ("PUL"). If PES is greater than PUL, then in step S1314, the upper limit for PES is selected from registers in DSP 206.

In step S1315, if PES lower limit ("PLL") is greater than the PES value, then in step S1316, the lower limit is selected from registers in DSP 206.

In step S1317, the PES value is output to POC 1204.

Figure 14:
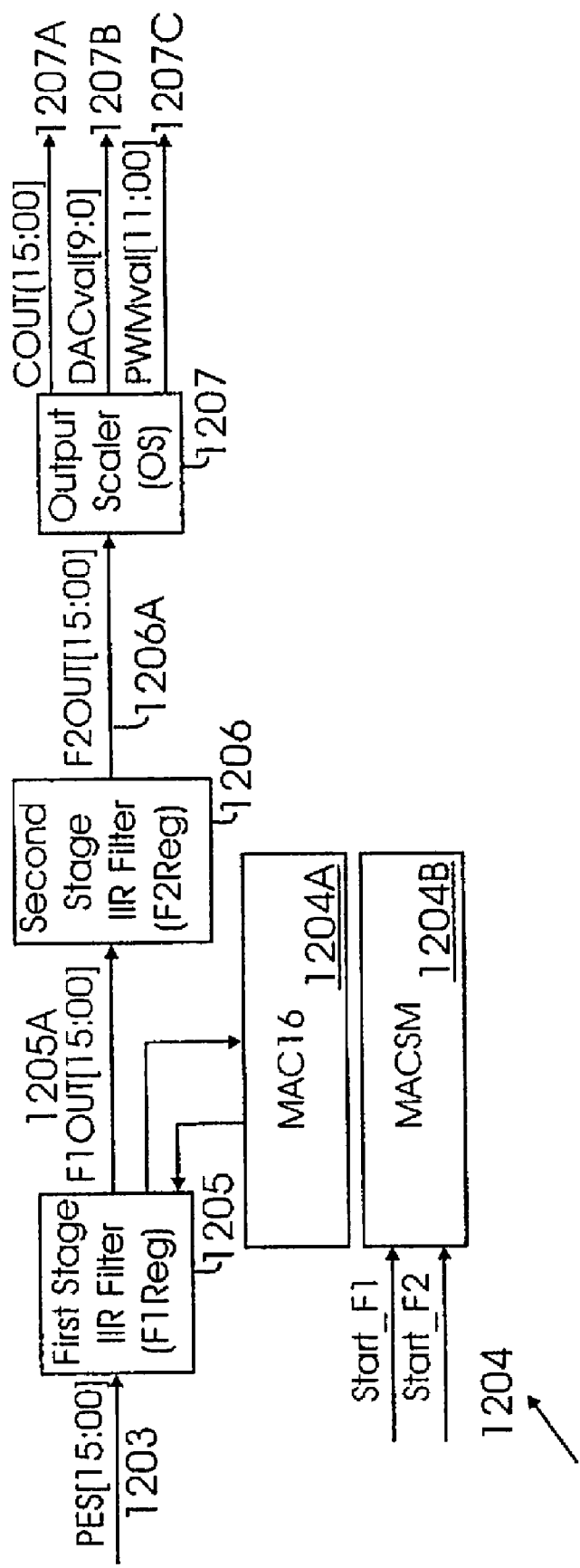
FIG. 14 shows a—block diagram of position correction output compensator, according to one aspect of the present invention.
Figure 15:
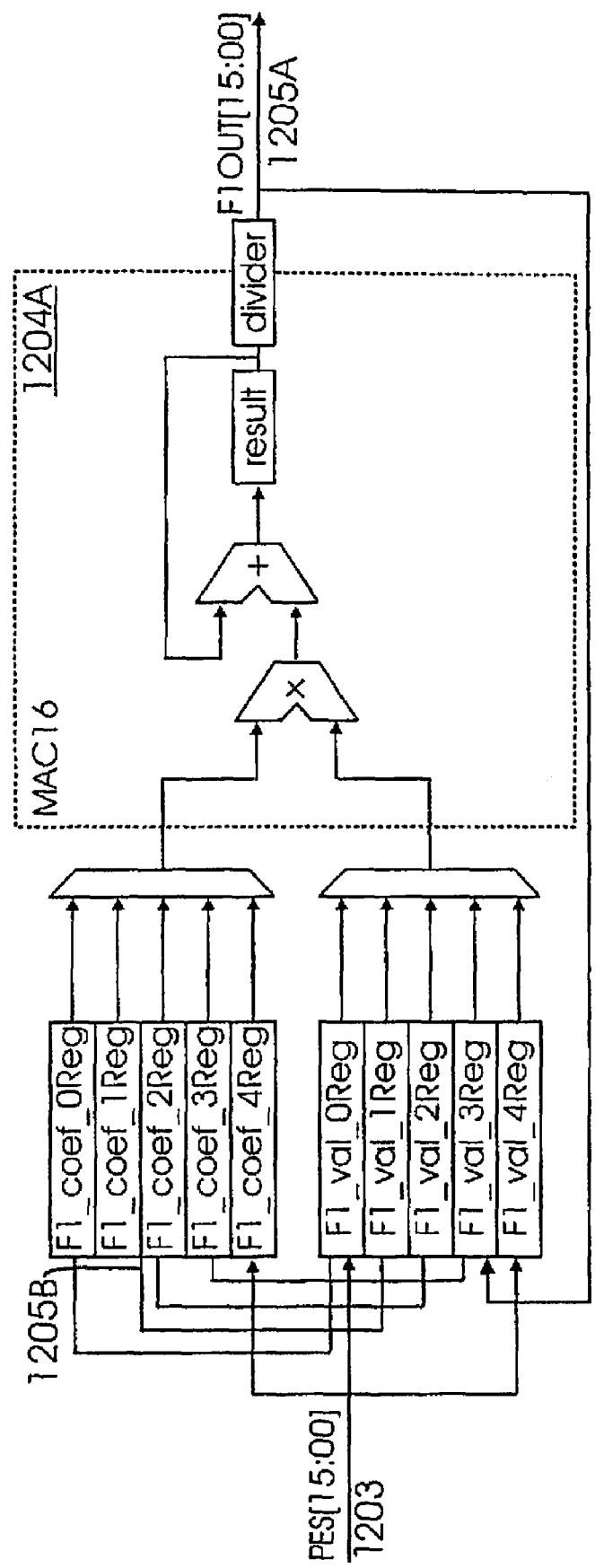
FIG. 15 shows a first stage filter block diagram, according to one aspect of the present invention.

Position Error Output Compensator ("POC"):

POC 1204 includes two infinite impulse response ("IIR") filter register sets, a first stage IIR filter (F1 filter) 1205 and a second stage IIR filter (F2 filter) 1206, as shown in FIG. 14. POC also includes a Multiply Accumulator Block (MAC) 1204A and a state machine (MACSM) 1204B. Filter 1205 is a "five tap" filter that receives PES 1203 and outputs 1205A. FIG. 15 shows a block diagram of filter 1205 and FIG. 16 shows a signal flow diagram for filter 1205.

Figure 16:
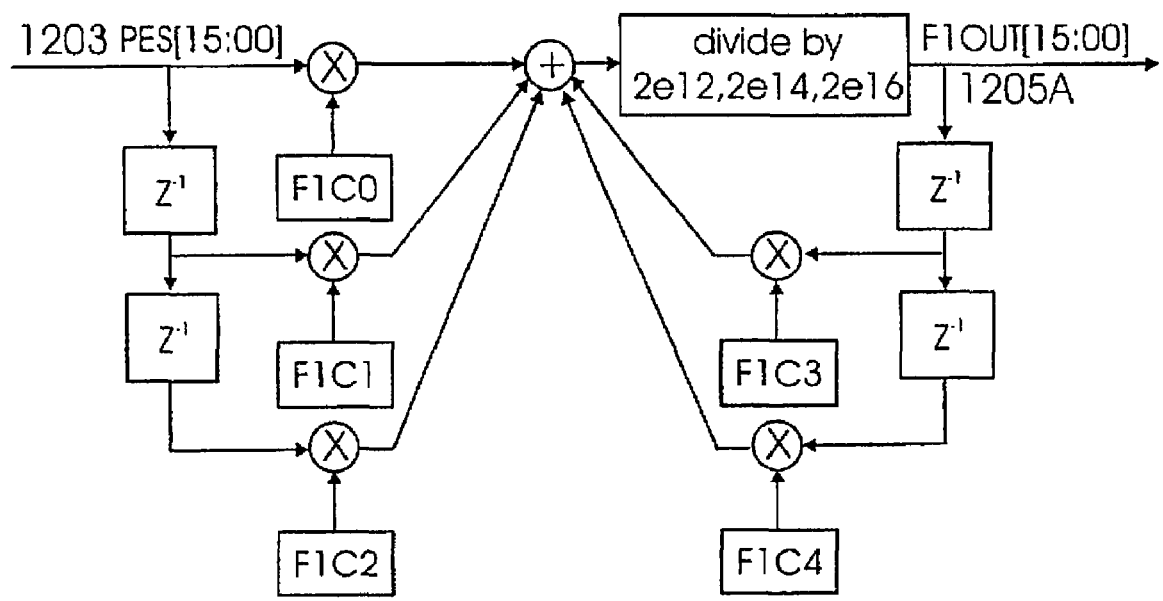
FIG. 16 shows a first stage filter signal flow diagram, according to one aspect of the present invention.

As shown in FIG. 16, each Z-1 block is used to represent a unit delay element. The delay factor for each unit delay element is the sample rate, and the sample rate depends on the servo sample rate and the mode of operation (1×, 2×, 4× or 8× multi-rate operation as defined by multi-rate timer 403) of DSP 206.

As shown in FIG. 15, filter 1205 uses MAC 1204A. Five multiplications occur in the signal path and each multiplication uses its own coefficient register 1205B.

Figure 17:
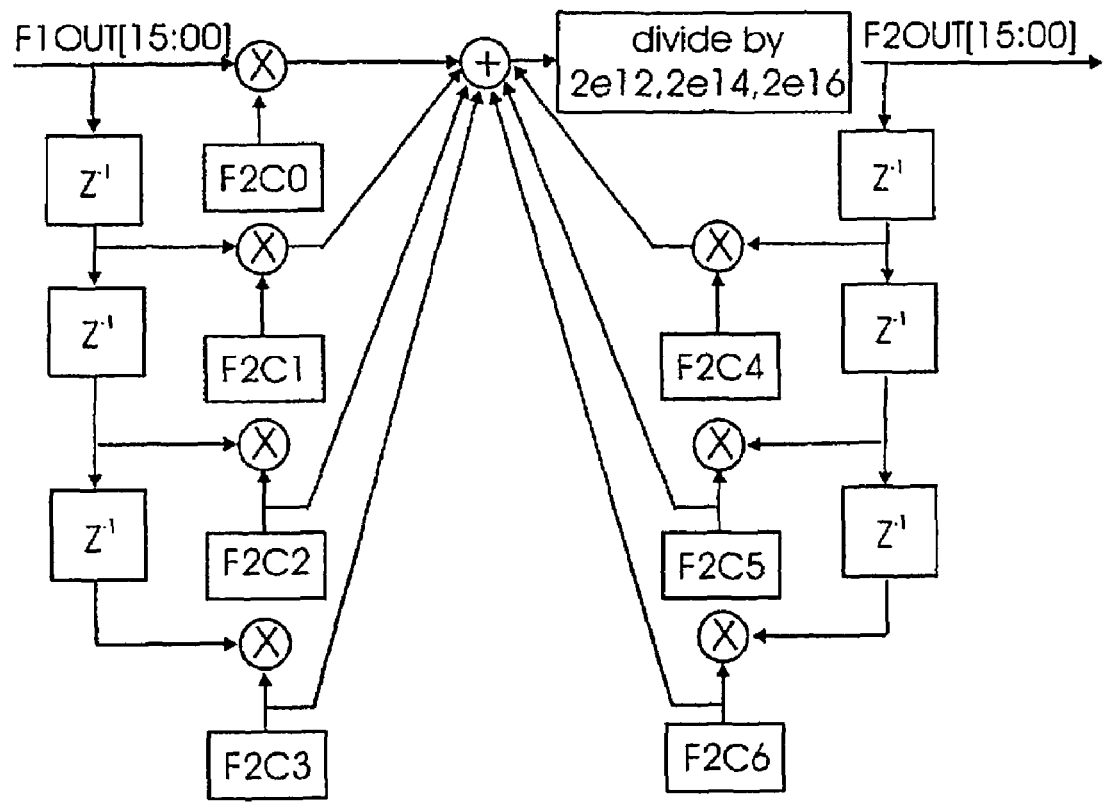
FIG. 17 shows a second stage filter signal flow diagram, according to one aspect of the present invention.

Second stage filter, F2 1206 is similar to filter 1205, except in this example it is a 7-tap filter. Signal flow through filter 1206 is shown in FIG. 17. It is noteworthy that the same MAC 1204A and MACSM 1204B is used for both the filters.

It is noteworthy that for F1 1205 and F2 1206, after all of the calculations are completed for one sample, the values are shifted to the next holding cell in preparation for the subsequent sample. After the shifting of data samples is completed, calculations begin for the next sample in anticipation of the arrival of the next data sample (PES 1203 or F1OUT 1205A).

Many calculations are performed in advance of the arrival of the next sample data, and when the next sample arrives, the only remaining calculation needed is to multiply the input sample by it's corresponding filter coefficient value (F1C0 or F2C0). This is referred to as "anticipation mode" and it reduces that amount of time required to produce the output of the filter (1205 or 1206) once the sample has arrived.

It is noteworthy that the first or second stage filters 1205 or 1206 can be bypassed using control register bits. Thus F1 1205 and/or F2 1206 can be used independently from the Position Error Calculator (PEC). Also F1 1205 and F2 1206 filters (through register programming) can be cascaded with the Position Error Calculator 1202 to create a fully automatic Position Error Calculation and Position Error Output Compensation signal path.

Output Scaler 1207:

Output 1206A is sent to Output scaler 1207 that checks the output range. Output scaler 1207 uses two register values from registers in DSP 206, (for upper and lower limits, respectively) to limit the range of the output signal. By using two registers, the output range can be assigned. By using two separate registers, the output range limits are allowed to be asymmetrical. If the output result is found to be outside of the specified limits, then the limit value, the previous value, or the null value is substituted for the output value as specified by control register bits.

Thereafter, the output is converted to a 10 bit unsigned value for the linear (digital to analog converter) DAC using a programmable DAC offset value (DOS[15:00]) that is used to form the output value. The unsigned 10 bit DACval[9:0] 1207B is calculated from the output (COUT[15:00]) 1207A and DOS[15:00] using a 16 bit saturating adder as described by the following equation:

$$DACval[9:0]=(COUT[15:00]-DOS[15:00]+32768)/64$$

If the COUT[15:00] 1207A does not require offsetting for the DAC, then the DOSReg can be left as zero. The DACval output 1207B is an unsigned number that ranges from 0 to 1023.

Also a 12 bit unsigned value PWMval[11:00] 1207B is calculated for the PWM0 LSB unit using the DAC offset value (DOS[15:00]) and the same 16 bit saturating adder as follows:

$$PWMval[11:00]=(COUT[15:00]-DOS[15:00]+32768)/16$$

PWMval output 1207B is an unsigned 12 bit number that ranges from 0 to 4095.

Finally, the current and last output values can be read through registers COUTReg and LOUTReg. If further compensation is desired, the current output value of the second stage filter 1206 can be modified and written back to the appropriate location depending on the control path being used (PWM or DAC).

In one aspect of the present invention the process and system automatically calculate linear position based on burst values. Both four and six burst formats are supported. Bursts pairs may be arranged in any order.

In yet another aspect of the present invention, position error signal is automatically calculated based on linear position and target position. The position error signal is automatically compared to several programmable limits, and several programmable values can be substituted when the error signal is outside of these limits (as shown in the flow diagram in FIG. 13).

In yet another aspect of the present invention, the position error calculation is automatically adjusted based on either recorded or electronically stored Run Out Correction (ROC) information.

The calculated error correction result is compensated using a single IIR filter or a cascaded pair of IIR filters. The pair of IIR filters can be used separately, or cascaded together, each having reduced input to output delay through the use of an anticipation mode.

In another aspect of the present invention, error calculations are automatically converted from a signed number of 16-bit resolution to an unsigned number of 14 to 10 bit resolution.

Although the present invention has been described with reference to specific embodiments, these embodiments are illustrative only and not limiting. Many other applications and embodiments of the present invention will be apparent in light of this disclosure and the following claims.

What is claimed is:

1. A track follow controller, comprising:
a burst selector configured to select at least one burst pair based on burst pair selection data; and
a linear position calculator configured to i) perform a first calculation of a position of a head, wherein the first calculation corresponds to a calculation using a first burst pair, ii) perform a second calculation of a position of a head, wherein the second calculation corresponds to a calculation using a second burst pair, iii) in response to an output of the first burst pair becoming nonlinear, switch between calculating using the first burst pair, the second burst pair, and a third burst pair, wherein the second burst pair is selected in response to the first burst pair becoming nonlinear in a positive direction, and the third burst pair is selected in response to the first burst pair becoming nonlinear in a negative direction, and iv) calculate a linear position of the head based on i) the first calculation and the second calculation.

2. The track follow controller of claim 1, wherein the burst pair selection data defines a lower limit burst pair, an upper limit burst pair, and a track follow burst pair.

3. The track follow controller of claim 1, wherein the burst pair selection data is adjustable based on a predetermined burst pair format.

4. The track follow controller of claim 1, further comprising a position error calculator configured to determine a position error based on the linear position and a target position.

5. The track follow controller of claim 4, wherein the position error calculator is configured to determine the position error further based on at least one threshold.

6. The track follow controller of claim 5, wherein the at least one threshold includes an upper limit and a lower limit.

7. The track follow controller of claim 6, wherein the position error calculator is configured to determine the position error further based on at least one of an adjustable gain value and a fixed gain value.

8. The track follow controller of claim 4, wherein the position error is automatically adjusted based on run out correction information.

9. A track follow controller, comprising:
a burst selector configured to select at least one burst pair based on burst pair selection data;
a linear position calculator configured to i) calculate a primary head position and a secondary head position based on the at least one burst pair, and ii) calculate a linear position of a head based on i) the primary head position and ii) the secondary head position; and
a position error calculator configured to determine a position error based on the linear position, a target position, at least one of an adjustable gain value and a fixed gain value, and at least one threshold, wherein the at least one threshold includes an upper limit and a lower limit,
wherein the position error calculator is configured to determine the position error further based on the adjustable gain value when the position error is at least one of greater than the upper limit and less than the lower limit.

10. A method, comprising:
selecting at least one burst pair based on burst pair selection data;
performing a first calculation of a position of a head, wherein the first calculation corresponds to a calculation using a first burst pair;
performing a second calculation of a position of a head, wherein the second calculation corresponds to a calculation using a second burst pair;
in response to an output of the first burst pair becoming nonlinear, switching between calculating using the first burst pair, the second burst pair, and a third burst pair, wherein the second burst pair is selected in response to the first burst pair becoming nonlinear in a positive direction, and the third burst pair is selected in response to the first burst pair becoming nonlinear in a negative direction; and
calculating a linear position of a head based on i) the first calculation and ii) the second calculation.

11. The method of claim 10, wherein the burst pair selection data defines a lower limit burst pair, an upper limit burst pair, and a track follow burst pair.

12. The method of claim 10, further comprising adjusting the burst pair selection data based on a predetermined burst pair format.

13. The method of claim 10, further comprising determining a position error based on the linear position and a target position.

14. The method of claim 13, further comprising determining the position error further based on at least one threshold.

15. The method of claim 14, wherein the at least one threshold includes an upper limit and a lower limit.

16. The method of claim 15, further comprising determining the position error further based on at least one of an adjustable gain value and a fixed gain value.

17. The method of claim 13, further comprising adjusting the position error based on run out correction information.

18. A method, comprising:
selecting at least one burst pair based on burst pair selection data;
calculating a primary head position and a secondary head position based on the at least one burst pair;
calculating a linear position of the head based on i) the primary head position and ii) the secondary head position;
determining a position error based on the linear position, a target position, at least one of an adjustable gain value and a fixed gain value, and at least one threshold, wherein the at least one threshold includes an upper limit and a lower limit; and
determining the position error further based on the adjustable gain value when the position error is at least one of greater than the upper limit and less than the lower limit.

* * * * *